(12) United States Patent
Asai et al.

(10) Patent No.: US 7,556,090 B2
(45) Date of Patent: Jul. 7, 2009

(54) VEHICULAR AIR-CONDITIONER PROVIDING A COMFORTABLE CONDITION FOR A PASSENGER

(75) Inventors: Norio Asai, Nukata-gun (JP); Yuji Honda, Okazaki (JP)

(73) Assignee: DENSO CORPORATION, Kariya (JP)

( * ) Notice: Subject to any disclaimer, the term of this patent is extended or adjusted under 35 U.S.C. 154(b) by 671 days.

(21) Appl. No.: 11/068,273

(22) Filed: Feb. 28, 2005

(65) Prior Publication Data

US 2005/0194125 A1    Sep. 8, 2005

(30) Foreign Application Priority Data

Mar. 3, 2004 (JP) .............. 2004-058599
Jun. 10, 2004 (JP) .............. 2004-172243
Jul. 14, 2004 (JP) .............. 2004-207281

(51) Int. Cl.
*B60H 1/00* (2006.01)
*B60H 3/00* (2006.01)

(52) U.S. Cl. ............... 165/202; 165/244; 165/247; 165/255; 165/42; 165/43; 236/49.3; 62/180; 62/186

(58) Field of Classification Search ............ 165/42, 165/43, 202, 244, 255, 247; 236/49.3; 62/180, 62/186
See application file for complete search history.

(56) References Cited

U.S. PATENT DOCUMENTS

2003/0051491 A1 * 3/2003 Kawai et al. ............... 62/161

FOREIGN PATENT DOCUMENTS

| JP | 57-67812 | 10/1955 |
|---|---|---|
| JP | 57-107614 | 12/1955 |
| JP | 58-026618 | 2/1983 |
| JP | 60-191509 | 12/1985 |
| JP | 62-008812 | 1/1987 |
| JP | 05-319072 | 12/1993 |
| JP | 11-129728 | 5/1999 |
| JP | 2000-219023 | 8/2000 |
| JP | 2002-362127 | 12/2002 |
| JP | 2004-119233 | 4/2004 |

OTHER PUBLICATIONS

Office Action dated Dec. 11, 2007 in Japanese Application No. 2004-172243 with English translation thereof.
Office Action dated Dec. 16, 2008 in Japanese Application No. 2004-207281.

* cited by examiner

*Primary Examiner*—John K Ford
(74) *Attorney, Agent, or Firm*—Harness, Dickey & Pierce, PLC

(57) ABSTRACT

When a target blown air temperature TAO is in a predetermined intermediate temperature zone, a blower is automatically stopped (S80), an outside air mode is selected when the blower 8 is automatically stopped. When an outside air temperature Tam is a first predetermined temperature (15° C.) or lower, an opening degree of an air mix door is corrected to a high temperature side in comparison with the time of the operation of the blower (S120), and when the outside air temperature Tam is a second predetermined temperature (25° C.) or higher, the opening degree of the air mix door is corrected to the low temperature side in comparison with the time of the operation of the blower (S130).

2 Claims, 14 Drawing Sheets

Fig. 6
(A)
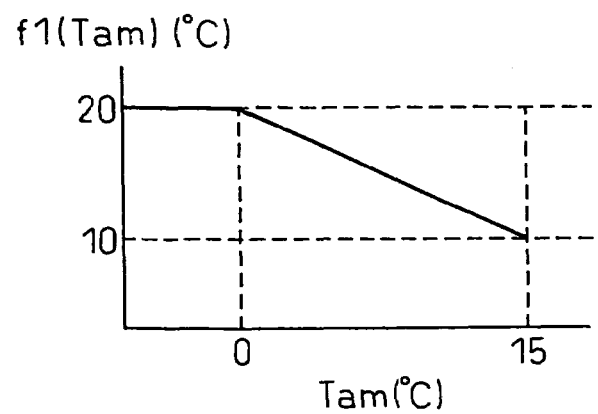
(B)
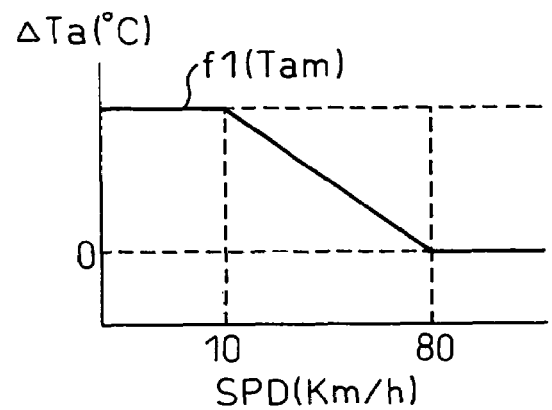
Fig. 7
(A)
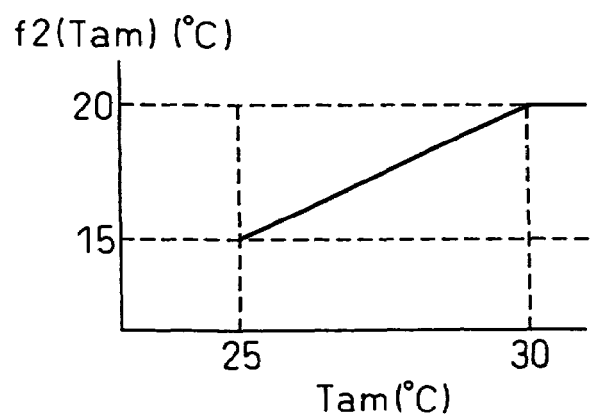
(B)
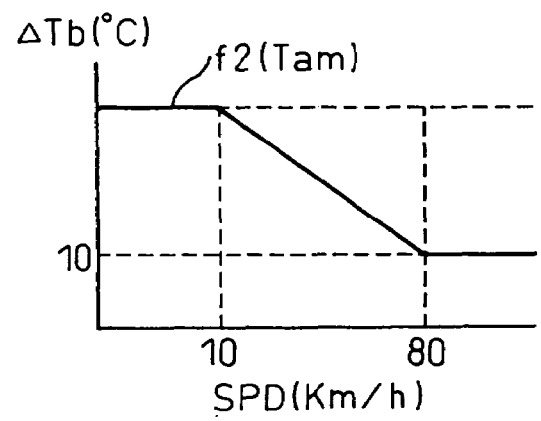

Fig.8
(A)
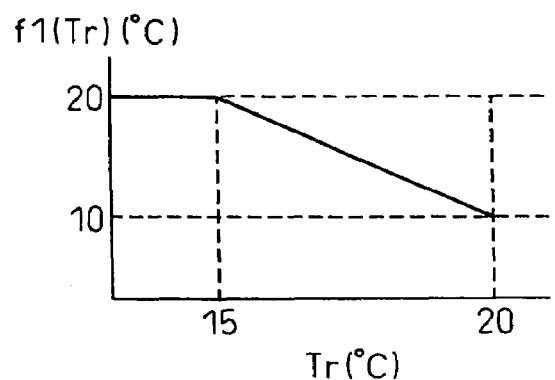
(B)
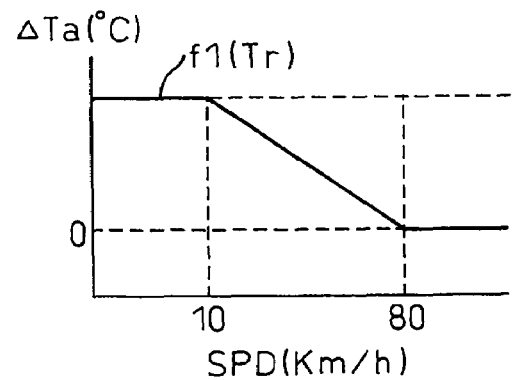
Fig.9
(A)
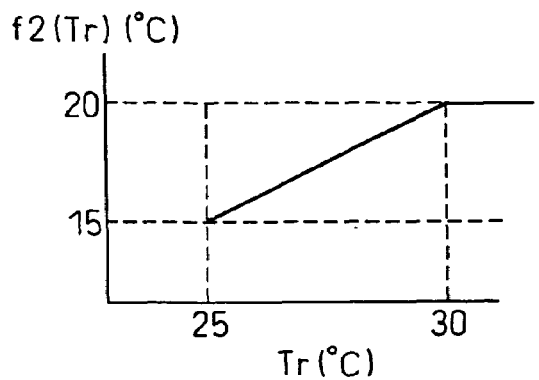
(B)
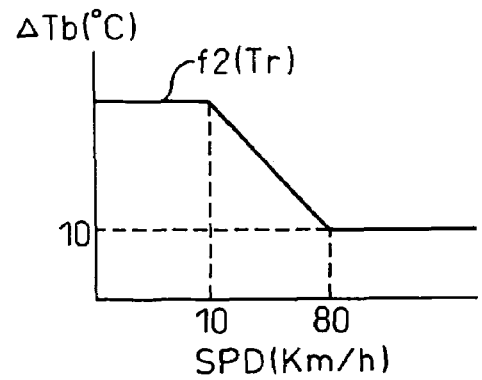

Fig.18
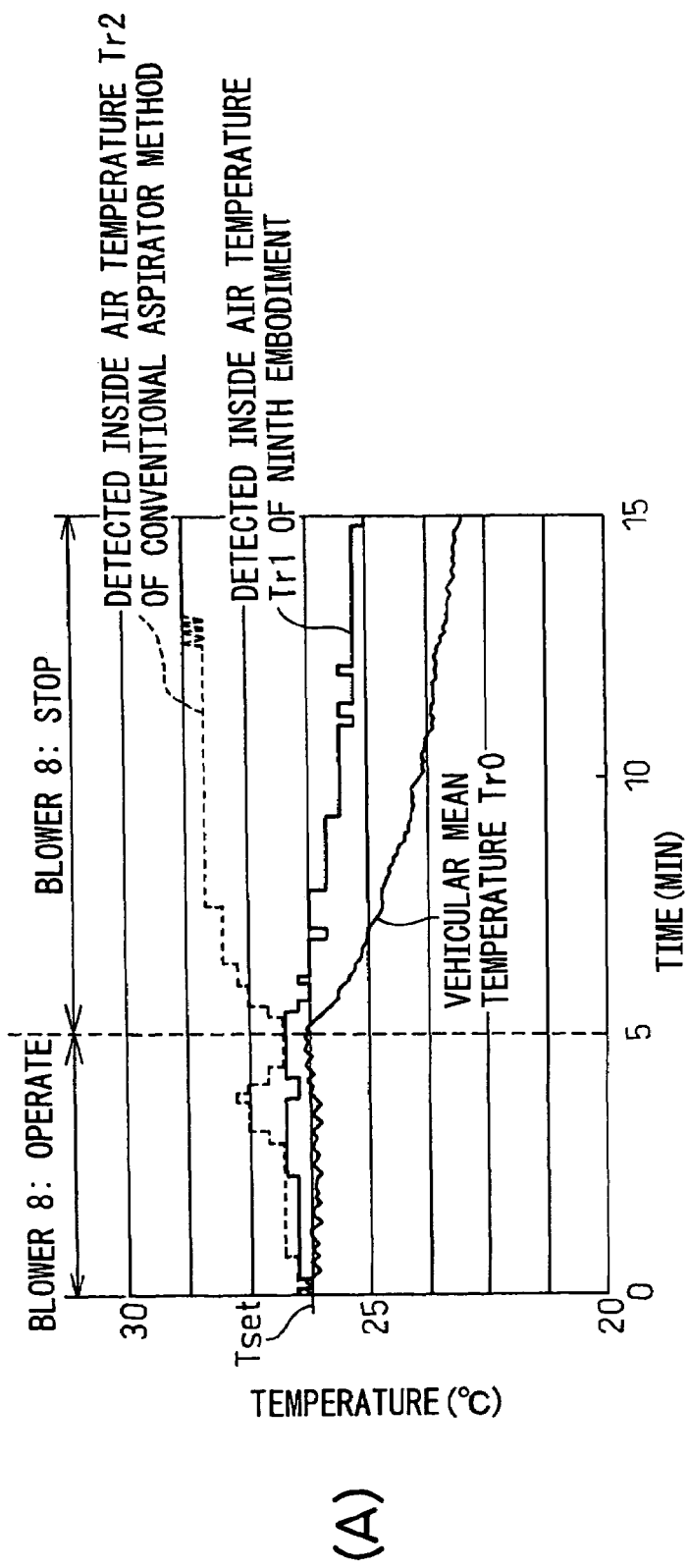
(A)
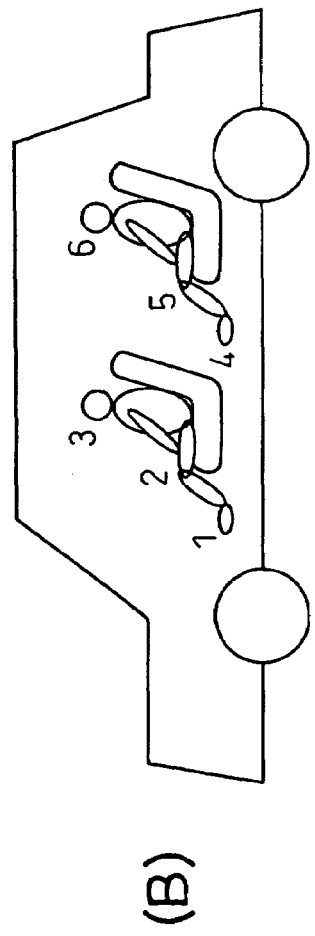
(B)

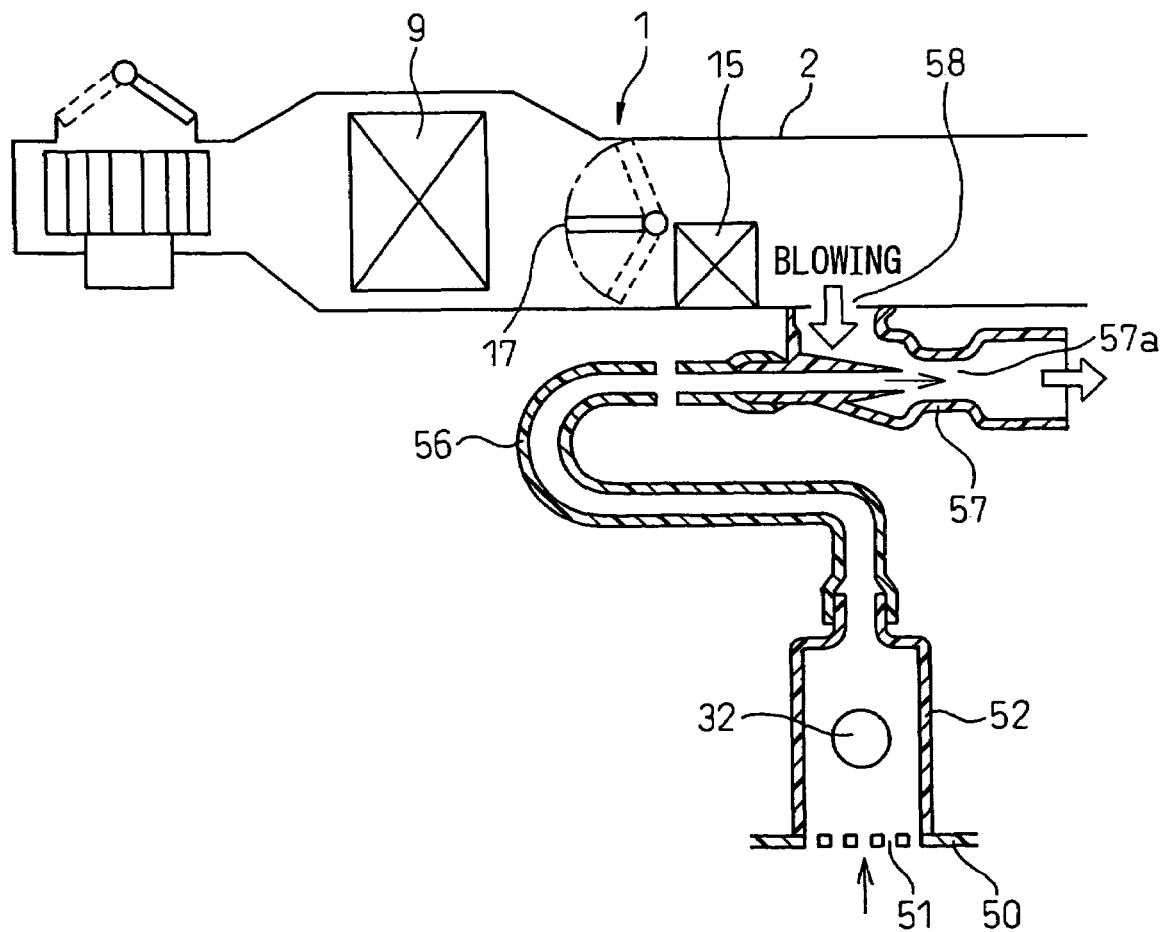

VEHICULAR AIR-CONDITIONER PROVIDING A COMFORTABLE CONDITION FOR A PASSENGER

BACKGROUND OF THE INVENTION

1. Field of the Invention

The present invention relates to control of the operation of a blower and a compressor in an automatic control type vehicular air-conditioner.

Further, the present invention relates to control for automatically stopping a blower in an automatic control type vehicular air-conditioner and control for correction of a temperature adjusting means accompanied with that.

Further, the present invention relates to a detection device of an inside air temperature in a vehicular air-conditioner for control for automatically stopping a blower.

2. Description of the Related Art

Conventionally, a vehicular air-conditioner calculates a target blown air temperature TAO for maintaining a temperature inside a vehicle compartment (inside air temperature) at a temperature set by a passenger and automatically controls the flow rate of the blower (flow rate of air blown into vehicle compartment) in accordance with the level of this target blown air temperature TAO (see for example Japanese Unexamined Patent Publication (Kokai) No. 58-26618).

More specifically, it continuously adjusts the rotational speed of the blower from the high speed region to the low speed region so as to increase the flow rate of the blower in a low temperature zone and a high temperature zone of the target blown air temperature TAO and reduce the flow rate of the blower in an intermediate temperature zone of TAO.

The prior art, however, is configured so that the blower continuously operates after the air-conditioner is activated. For this reason, as time elapses from when activating the air-conditioner, the air-conditioning state in the vehicle compartment advances. Even when the temperature in the vehicle compartment reaches near the set temperature and the inside of the vehicle compartment forms a comfortable air-conditioned state, however, the blower continues to operate. For this reason, some passengers feel that the operating sound of the blower is bothersome and manually operate the blower operation switch to stop the blower.

This means that the passenger is forced to manually operate the blower operation switch irrespective of the automatic control type air-conditioner, so the point of the automatic control is diminished.

Therefore, the present inventors previously proposed a vehicular air-conditioner for automatically judging an air-conditioning condition under which a passenger wants to stop the blower and automatically stopping the blower at the same in Japanese Patent Application No. 2004-58599.

In the vehicular air-conditioner for control for automatically stopping a blower as in this prior application, when selecting the outside air mode at the time of the operation of the vehicle, the outside air is introduced into an air passage of the air-conditioner by the vehicle operation dynamic pressure (ram pressure). Therefore, even if the blower is automatically stopped, temperature-adjusted outside air-conditioning air can be blown into the vehicle compartment.

At the time of low vehicle speed, however, the flow rate of the outside air introduced by the vehicle operation dynamic pressure is small, so phenomenon arises of the flow rate of the air blown into the vehicle compartment becoming insufficient. For this reason, at the time of heating in the winter, when automatically stopping the blower, the temperature in the vehicle compartment becomes lower than the comfortable temperature zone and the comfort of the passenger is degraded. Further, at the time of the cooling in the summer, when automatically stopping the blower, the temperature in the vehicle compartment rises over the comfortable temperature zone and the comfort of the passenger is degraded. As a result, the time during which the blower is automatically stopped becomes short.

As an inside air detection device for detecting the inside air temperature, the aspirator system is representative. This aspirator system, as shown in FIG. 21, houses an inside air temperature sensor (thermistor) 32 in a sensor case 52 sucking in air in the vehicle compartment from an inside air suction port 51 and, at the same time, connecting the sensor case 52 to an aspirator body 57 by an aspirator hose 56.

This aspirator body 57 is attached to a circumferential wall surface of an opening 58 of the air-conditioning case 2 of a vehicle compartment air-conditioning unit 1. By introducing a slight amount of the air into the air-conditioning case 2 from the opening 58 and passing this introduced air through an orifice 57a, a negative pressure is generated.

Due to this, the air in the vehicle compartment passes through the inside air suction port 51, the sensor case 52, and the aspirator hose 56 to be is sucked into the aspirator body 57, then the inside air temperature (temperature in vehicle compartment) is detected by the inside air temperature sensor 32 in the sensor case 52.

According to the prior application, however, when the blower automatically stopped, the flow rate of the air in the vehicle compartment air-conditioning unit became zero or was largely reduced and, therefore, in the inside air temperature detection device of the aspirator system, the flow rate of the air passing around the inside air temperature sensor 32 also became zero or was largely reduced.

In addition to this, when the blower automatically stopped, the temperature of the air-conditioning case 2 of the vehicle compartment air-conditioning unit 1 rose due to the influence of heat of a heater core (heating use heat exchanger) 15. Further, since the sensor case 52 was thermally connected to the air-conditioning case 2 of the vehicle compartment air-conditioning unit 1 via the aspirator hose 56 and the aspirator body 57, the temperature of the sensor case 52 also rose.

As a result, in the prior application, it was learned that the precision of detection of the inside air temperature dropped when the blower was automatically stopped.

SUMMARY OF THE INVENTION

An object of the present invention is to provide a vehicular air-conditioner which automatically stops a blower by automatically judging an air-conditioning condition under which a passenger wants to stop the blower.

Another object of the present invention is to provide a vehicular air-conditioner for automatically stopping a blower by automatically judging the air-conditioning condition under which a passenger wants to stop the blower wherein a longer automatic stopping time of the blower is achieved when blowing outside air-conditioning air into a vehicle compartment by a vehicle operation dynamic pressure when the blower is automatically stopped.

Still another object of the present invention is to provide a vehicular air-conditioner for automatically stopping a blower which precisely detects the inside air temperature when the blower is automatically stopped.

To attain the above objects, according to a first aspect of the present invention, there is provided an automatic control type vehicular air-conditioner for automatically controlling the temperature of air blown into a vehicle compartment and the flow rate of the air blown into the vehicle compartment, comprising a blower (8) for blowing the air toward an inside of the vehicle compartment; blower controlling means (S50, S80) for automatically controlling the operation of the blower (8); temperature adjusting means (17) for adjusting the temperature of the air blown into the vehicle compartment; and blowing temperature controlling means (S70, S120, S130) for automatically controlling the operation position of the temperature adjusting means (17), wherein the blower controlling means (S50, S80) perform control for automatically controlling the flow rate of the blower (8) and also control for automatically stopping the blower (8) based on an air-conditioning heat load condition, the blowing temperature controlling means (S70, S120, S130) include correcting means (S120, S130) for correcting the operation position of the temperature adjusting means (17) when an outside air mode is selected when the blower (8) is automatically stopped, and the correcting means (S120, S130) correct the operation position of the temperature adjusting means (17) to a high temperature side in comparison with the time of the operation of the blower (8) under a condition where the outside air introduced by the outside air mode is heated to a temperature higher than the outside air temperature and then blown into the vehicle compartment, while corrects the operation position of the temperature adjusting means (17) to a low temperature side in comparison with the time of the operation of the blower (8) under a condition where the outside air introduced by the outside air mode is cooled to a temperature lower than the outside air temperature and then blown into the vehicle compartment.

According to this, the blower (8) is automatically stopped based on the air-conditioning heat load condition, therefore, the state of the temperature in the vehicle compartment being maintained near a set temperature comfortable for the passenger is judged based on the air-conditioning heat load condition, and the blower (8) can be automatically stopped.

Accordingly, in the comfortable air-conditioning state, the operation sound of the blower (8) is eliminated and the inside the vehicle compartment can be made a silent environment, so the comfort of the passenger can be further improved. Further, the power consumption of the blower (8) can be reduced. In addition, a silent environment can be created in the vehicle compartment without troubling the passenger with a manual operation. This is extremely advantageous in practical use.

Further, under a condition where the outside air introduced by the outside air mode is heated to a temperature higher than the outside air temperature and then blown into the vehicle compartment when the blower (8) is automatically stopped, the operation position of the temperature adjusting means (17) is corrected to the high temperature side in comparison with the time of the operation of the blower (8), therefore the blowing temperature of the vehicle compartment blown air (hot air) can be corrected to the high temperature side.

Further, under a condition where the outside air introduced by the outside air mode when the blower (8) is automatically stopped is cooled to a temperature lower than the outside air temperature and then blown into the vehicle compartment, the operation position of the temperature adjusting means (17) is corrected to the low temperature side in comparison with the operation of the blower (8), therefore the blowing temperature of the vehicle compartment blown air (cool air) can be corrected to the low temperature side.

As a result, even if the phenomenon arises that the flow rate of the air blown into the vehicle compartment becomes insufficient when the blower (8) is automatically stopped, a drop in the temperature in the vehicle compartment in the heating zone and a rise of the temperature in the vehicle compartment in the cooling zone can be suppressed. Due to this, a longer automatic stop time of the blower (8) can be achieved, so the effect of the automatic stop control of the blower (8) can be further effectively exhibited.

According to a second aspect of the present invention, there is provided a vehicular air-conditioner of the first aspect wherein a condition where the outside air is heated to a temperature higher than the outside air temperature and then blown into the vehicle compartment is the time of a low outside air temperature where the outside air temperature is a first predetermined temperature or less, and a condition where the outside air is cooled to a temperature lower than the outside air temperature and then blown into the vehicle compartment is the time of a high outside air temperature where the outside air temperature is not less than a second predetermined temperature higher than the first predetermined temperature by a predetermined temperature.

According to a third aspect of the present invention, there is provided a vehicular air-conditioner of the second aspect wherein at the time of the low outside air temperature, the lower the outside air temperature, the larger the correction amount of the operation position of the temperature adjusting means (17) to the high temperature side, and at the time of the high outside air temperature, the higher the outside air temperature, the larger the correction amount of the operation position of the temperature adjusting means (17) to the low temperature side.

According to this, the correction amount of the operation position of the temperature adjusting means (17) can be finely adjusted corresponding to the level of the outside air temperature. For this reason, the operation position of the temperature adjusting means (17) can be corrected to a more adequate direction in accordance with the air-conditioning heat load.

According to a fourth aspect of the present invention, there is provided a vehicular air-conditioner of the first aspect wherein the condition where the outside air is heated to a temperature higher than the outside air temperature and then blown into the vehicle compartment is a low inside air temperature time where the inside air temperature is a first predetermined temperature or less, and the condition where the outside air is cooled to a temperature lower than the outside air temperature and then blown into the vehicle compartment is a high inside air temperature time where the inside air temperature is not less than a second predetermined temperature higher than the first predetermined temperature by a predetermined temperature.

According to a fifth aspect of the present invention, there is provided a vehicular air-conditioner of the fourth aspect wherein at the time of the low inside air temperature, the lower the inside air temperature, the larger the correction amount of the operation position of the temperature adjusting means (17) to the high temperature side, and at the time of the high inside air temperature, the higher the inside air temperature, the larger the correction amount of the operation position of the temperature adjusting means (17) to the low temperature side.

According to this, the correction amount of the operation position of the temperature adjusting means (17) can be finely adjusted corresponding to the level of the inside air temperature. For this reason, the operation position of the temperature adjusting means (17) can be corrected to a more adequate direction in accordance with the air-conditioning heat load.

According to a sixth aspect of the present invention, there is provided a vehicular air-conditioner of the first aspect wherein the condition where the outside air is heated to a temperature higher than the outside air temperature and then blown into the vehicle compartment is the time when the inside air temperature is lower than the set temperature in the vehicle compartment, and the condition where the outside air is cooled to a temperature lower than the outside air temperature and then blown into the vehicle compartment is the time when the inside air temperature is higher than the set temperature in the vehicle compartment.

According to a seventh aspect of the present invention, there is provided a vehicular air-conditioner of the sixth aspect wherein when the inside air temperature is lower than the set temperature, the larger the temperature difference between the inside air temperature and the set temperature, the larger the correction amount of the operation position of the temperature adjusting means (17) to the high temperature side, and when the inside air temperature is higher than the set temperature, the larger the temperature difference between the inside air temperature and the set temperature, the larger the correction amount of the operation position of the temperature adjusting means (17) to the low temperature side.

According to this, the correction amount of the operation position of the temperature adjusting means (17) can be finely adjusted in accordance with the temperature difference between the inside air temperature and the set temperature. For this reason, the operation position of the temperature adjusting means (17) can be corrected to a more adequate direction in accordance with the air-conditioning heat load.

According to an eighth aspect of the present invention, there is provided a vehicular air-conditioner of any one of the third, fifth, and seventh aspects of the invention wherein the correction amount of the operation position of the temperature adjusting means (17) to the high temperature side and the correction amount of the operation position of the temperature adjusting means (17) to the low temperature side are increased as the vehicle speed is lowered.

According to this, even if the vehicle speed is lowered and the flow rate of outside air introduced by the operation dynamic pressure is lowered, by making the correction amount of the operation position of the temperature adjusting means (17) larger in accordance with the drop of the vehicle speed, a drop of the temperature in the vehicle compartment in the heating zone and a rise of the temperature in the vehicle compartment in the cooling zone can be more effectively suppressed.

According to a ninth aspect of the present invention, there is provided an automatic control type vehicular air-conditioner for automatically controlling the temperature of air blown into a vehicle compartment and the flow rate of air blown into the vehicle compartment, comprising judging means (S60) for judging if the air-conditioning heat load for maintaining the temperature in the vehicle compartment at the set temperature is within a minimum range of a predetermined amount or less; and blower stopping means (S90) for automatically stopping a blower (8) for blowing air toward the inside of the vehicle compartment when judging that the air-conditioning heat load is within the minimum range.

In the present invention, the term "air-conditioning heat load for maintaining the temperature in the vehicle compartment at the set temperature" corresponds to the heat amount for heating or cooling the air blown into the vehicle compartment in order to maintain the temperature in the vehicle compartment at the set temperature. The state when this air-conditioning heat load is within a minimum range of a predetermined amount or less is a state where the temperature in the vehicle compartment is maintained near the set temperature comfortable for the passenger.

Accordingly, when performing control for judging if this air-conditioning heat load is within a minimum range of a predetermined amount or less and automatically stopping the blower (8), the inside of the vehicle compartment can be made a silent environment by eliminating the operation sound of the blower (8), and the comfort of the passenger can be further improved. Further, the power consumption of the blower (8) can be reduced.

In addition, since the air-conditioning heat load situation is judged and control is performed for automatically stopping the blower (8), a silent environment can be created in the vehicle compartment without troubling the passenger with a manual operation. This is extremely advantageous in practical use.

According to a 10th aspect of the present invention, there is provided a vehicular air-conditioner of the ninth aspect further comprising a cooling use heat exchanger (9) for cooling the air blown into the vehicle compartment, a compressor (11) of a refrigeration cycle for creating the cooling state of the cooling use heat exchanger (9), and compressor stopping means (S100) for automatically stopping the compressor (11) when judging that the air-conditioning heat load is within the minimum range.

According to this, the compressor (11) of the refrigeration cycle is also automatically stopped linked with the automatic stopping of the blower (8) by judging the air-conditioning heat load situation, therefore the drive power of the compressor (11) can be reduced together with the reduction of the power consumption of the blower (8).

According to an 11th aspect of the present invention, there is provided a vehicular air-conditioner of the ninth or 10th aspect further comprising temperature adjusting means (17) for adjusting the temperature of the air blown into the vehicle compartment, temperature controlling means (S40, S50) for automatically controlling the temperature adjusting means (17) so that the temperature of the air blown into the vehicle compartment becomes a target blown air temperature (TAO), and blower controlling means (S70) for automatically controlling the flow rate of the blower (8) in accordance with the target blown air temperature (TAO) when the air-conditioning heat load is out of the minimum range.

According to this, when the air-conditioning heat load is out of the minimum range, the flow rate of the blower (8) is automatically controlled in accordance with the target blown air temperature (TAO). The flow rate of the air blown into the vehicle compartment can be automatically controlled in accordance with the target blown air temperature (TAO) by this. Further, when performing such automatical control of the flow rate, the effect of control for automatically stopping the blower in the ninth aspect or control for automatically stopping the compressor in the 10th aspect can be exhibited.

According to a 12th aspect of the present invention, there is provided a vehicular air-conditioner of the 11th aspect wherein the judging means (S60) can judge that the air-conditioning heat load is within the minimum range based on the target blown air temperature (TAO).

Accordingly, by utilizing the target blown air temperature (TAO) as a control value of the temperature control, the flow rate control, etc. of the air blown into the vehicle compartment as it is, the judgment of the air-conditioning heat load situation can be simply and conveniently carried out.

According to a 13th aspect of the present invention, there is provided a vehicular air-conditioner of any one of the ninth to 11th aspects wherein the judging means (S60) can judge that the air-conditioning heat load is within the minimum range when the temperature difference between the temperature in the vehicle compartment and the set temperature is within a predetermined value.

According to a 14th aspect of the present invention, there is provided a the vehicular air-conditioner of any one of the ninth to 11th aspects wherein the judging means (S60) can judge that the air-conditioning heat load is within the minimum range when the temperature difference between the outside air temperature and the set temperature is within a predetermined value.

According to a 15th aspect of the present invention, there is provided a vehicular air-conditioner of any one of the ninth to 11th aspects wherein the judging means (S60) can judge that the air-conditioning heat load is within the minimum range based on at least the temperature in the vehicle compartment among the temperature in the vehicle compartment and an amount of sunshine.

According to a 16th aspect of the present invention, there is provided a vehicular air-conditioner of any one of the ninth to 11th aspects wherein the judging means (S60) can judge that the air-conditioning heat load is within the minimum range based on at least the outside air temperature among the outside air temperature and an amount of sunshine.

According to a 17th aspect of the present invention, there is provided an automatic control type vehicular air-conditioner for automatically controlling a temperature of air blown into a vehicle compartment and a flow rate of the air blown into the vehicle compartment, comprising a blower (8) for blowing air toward the inside of the vehicle compartment; heat exchangers (9, 15) for heat exchange with the blown air of the blower (8); an air-conditioning case (2) having the blower (8) and the heat exchangers (9, 15) built in and forming a passageway of air toward the inside of the vehicle compartment; blower controlling means (S70, S90) for automatically controlling the operation of the blower (8); an inside air temperature detection device (60) for detecting the temperature in the vehicle compartment; temperature adjusting means (17) for adjusting the temperature of the air blown into the vehicle compartment; and blowing temperature controlling means (S20, S40, S50) for automatically controlling the operation position of the temperature adjusting means (17) based at least on a detected temperature of the inside air temperature detection device (60), wherein the blower controlling means (S70, S90) perform control for automatically controlling the flow rate of the blower (8) and the control for automatically stopping the blower (8) based on an air-conditioning heat load condition, and the inside air temperature detection device (60) has an inside air temperature sensor (32) for detecting the air temperature in the vehicle compartment, an electric fan (53) for sucking the air in the vehicle compartment and circulating it around the inside air temperature sensor (32), and heat insulating means (54, 50) for preventing the heat from the air-conditioning case (2) from being transmitted to the inside air temperature sensor (32).

According to this, in the same way as the prior application, the blower (8) is automatically stopped based on the air-conditioning heat load condition, therefore, the inside of the vehicle compartment can be made a silent environment by eliminating the operation sound of the blower (8) in the comfortable air-conditioning state, and the comfort of the passenger can be further improved. In addition, no troublesome manual operation is forced on the passenger. This is extremely advantageous in practical use.

Further, since provision is made of an electric fan (53) for sucking the air in the vehicle compartment into the inside air temperature detection device (60) and circulating it around the inside air temperature sensor (32), exactly the required flow rate of the air into the vehicle compartment can be supplied to the inside air temperature sensor (32) by the electric fan (53) dedicated to the sensor even when the blower (8) is automatically stopped.

Further, even if the temperature of the air-conditioning case (2) rises due to the heat of the heating use heat exchanger (15) when the blower (8) is automatically stopped, the transmission of the heat from the air-conditioning case (2) to the inside air temperature sensor (32) can be prevented by the heat insulating means (54, 50).

By combining the blowing action of the air in the vehicle compartment by the electric fan (53) dedicated to the sensor and the blocking action of the heat from the air-conditioning case (2) by the heat insulating means (54, 50) in this way, the precision of detection of the inside air temperature at the time of automatic stopping of the blower (8) is secured, and the temperature of the air blown into the vehicle compartment can be controlled well.

According to an 18th aspect of the present invention, there is provided a vehicular air-conditioner of the 17th aspect further comprising a heat insulation cover (54) for covering the outer surface of the inside air temperature sensor (32) and the electric fan (53), wherein the heat insulating means can be configured by the heat insulation cover (54).

According to a 19th aspect of the present-invention, there is provided a vehicular air-conditioner of the 17th or 18th aspect wherein both of the inside air temperature detection device (60) and the air-conditioning case (2) can be arranged at an inner side of a vehicle instrument panel (50).

According to a 20th aspect of the present invention, there is provided a vehicular air-conditioner of the 17th aspect wherein the air-conditioning case (2) is arranged at an inner side of an vehicle instrument panel (50), the inside air temperature detection device (60) is arranged at an outer side of the vehicle instrument panel (50), and the heat insulating means is configured by the vehicle instrument panel (50) per se.

According to this, by utilizing the already existing vehicle instrument panel (50) per se as the heat insulating means, the precision of detection of the inside air temperature when the blower (8) is automatically stopped can be secured. Accordingly, it is also possible not to provide heat insulating means dedicated to the inside air temperature detection device (60) and to reduce the cost of the inside air temperature detection device (60).

According to a 21st aspect of the present invention, there is provided a vehicular air-conditioner of the 20th aspect wherein the inside air temperature detection device (60) can be arranged so as to protrude from the outer side of the vehicle instrument panel (50).

According to a 22nd aspect of the present invention, there is provided a vehicular air-conditioner of the 20th aspect wherein a recess (50b) sunk in the inward direction of the vehicle instrument panel (50) is formed in the vehicle instrument panel (50), and the inside air temperature detection device (60) is arranged in the recess (50b).

Note that notations in parentheses after the means show correspondence with specific means described in the following embodiments.

BRIEF DESCRIPTION OF THE DRAWINGS

These and other objects and features of the present invention will become clearer from the following description of the preferred embodiments given with reference to the attached drawings, wherein:

FIGS. 6(A) and (B) are graphs of a TAO correction amount for correcting an opening degree of an air mix door at the time of a low outside air temperature according to the first embodiment;

FIGS. 7(A) and (B) are graphs of the TAO correction amount for correcting an opening degree of the air mix door at the time of a high outside air temperature according to the first embodiment;

FIGS. 8(A) and (B) are graphs of the TAO correction amount for correcting an opening degree of the air mix door at the time of a low inside air temperature according to a second embodiment;

FIGS. 9(A) and (B) are graphs of the TAO correction amount for correcting an opening degree of the air mix door at the time of a high inside air temperature according to the second embodiment;

FIG. 18(A) is a graph showing the effect of the detection of the inside air temperature according to the seventh embodiment, while (B) is an explanatory view of the measurement positions of a mean temperature in the vehicle compartment indicated in (A);

FIG. 21 is a sectional view of an inside air temperature detection device of a conventional aspirator system.

DESCRIPTION OF THE PREFERRED EMBODIMENTS

Preferred embodiments of the present invention will be described in detail below while referring to the attached figures.

First Embodiment

Figure 1:
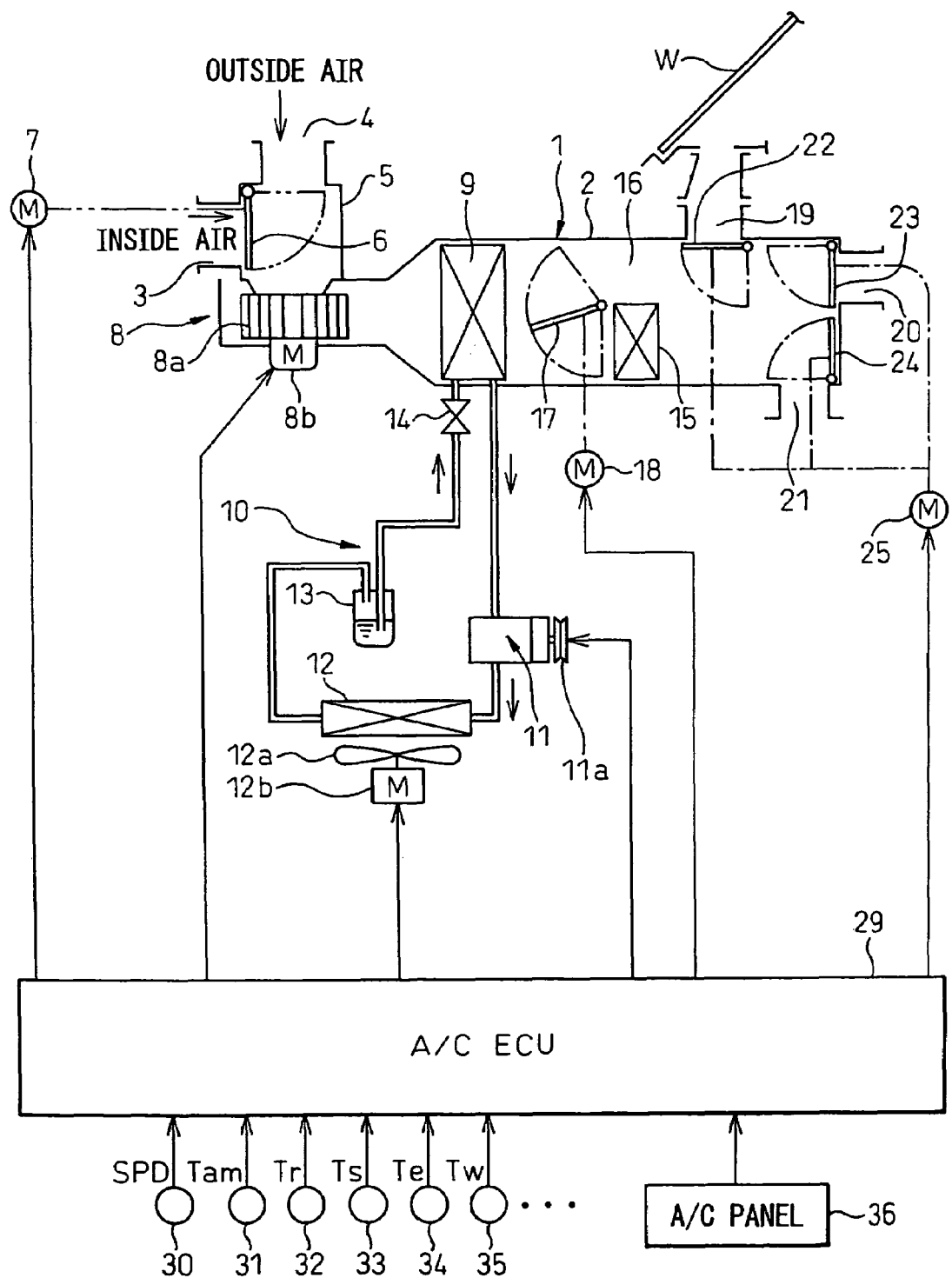
FIG. 1 is an overall view of the system configuration of a first embodiment of the present invention.

FIG. 1 shows the overall configuration of a first embodiment. The vehicular air-conditioner is provided with a vehicle compartment air-conditioning unit 1 arranged at an inner side of the instrument panel (not illustrated) of the frontmost portion in a vehicle compartment. This vehicle compartment air-conditioning unit 1 has a case 2. An air passageway for blowing air toward the inside of the vehicle compartment is configured in this case 2.

An inside/outside air switch box 5 having an inside air introduction port 3 and an outside air introduction port 4 is arranged at the uppermost stream portion of the air passageway of this case 2. In this inside/outside air switch box 5, an inside/outside air switch door 6 serving as the inside/outside switching means is rotatably arranged.

This inside/outside air switch door 6 is driven by a servo motor 7 and switches between an inside air mode introducing the inside air (air in the vehicle compartment) from the inside air introduction port 3 and an outside air mode introducing the outside air (air outside the vehicle compartment) from the outside air introduction port 4.

On the downstream side of the inside/outside air switch box 5, an electric blower 8 for generating an air flow heading toward the inside of the vehicle compartment is arranged. This blower 8 drives a centrifugal fan 8a by a motor 8b. On the downstream side of the blower 8, an evaporator 9 for cooling the air flowing in the case 2 is arranged. This evaporator 9 is a cooling use heat exchanger for cooling the blown air of the blower 8 and is one of the elements configuring the refrigeration cycle system 10.

Note that the refrigeration cycle system 10 is a known device formed so that a refrigerant circulates in the evaporator 9 via a condenser 12, a liquid receiver 13, and an expansion valve 14 forming the pressure reducing means from the exhaust side of the compressor 11. The air outside the room (cool air) is blown to the condenser 12 by the electric type cooling fan 12a.

In the refrigeration cycle system 10, the compressor 11 is driven by a vehicle engine (not illustrated) via an electromagnetic clutch 11a. Accordingly, the operation of the compressor 11 can be intermittently controlled by the on and off state of the power supply of the electromagnetic clutch 11a. Further, the evaporator 9 cools the blown air by absorbing the heat from the blown air of the blower 8 by the refrigerant in the low temperature and low pressure two phase gaseous and liquid states after the pressure is reduced by the expansion valve 14 and evaporation.

On the other hand, in the vehicle compartment air-conditioning unit 1, a heater core 15 for heating the air flowing in the case 2 is arranged on the downstream side of the evaporator 9. This heater core 15 is a heating use heat exchanger for heating the air (cold air) after passing through the evaporator 9 using the hot water (engine cooling water) of the vehicle engine as a heat source. A bypass 16 is formed on the side of the heater core 15. The bypass air of the heater core 15 flows through this bypass 16.

An air mix door 17 forming the temperature adjusting means is rotatably arranged between the evaporator 9 and the heater core 15. This air mix door 17 is driven by a servo motor 18. The rotation position (opening degree) thereof can be continuously adjusted.

According to the opening degree of this air mix door 17, the ratio between the flow rate (hot flow rate) of air passing through the heater core 15 and the flow rate of air (cold flow rate) passing through the bypass 16 and bypassing the heater core 15 is adjusted. The temperature of the air blown into the vehicle compartment is adjusted by this.

Three types of blowing ports in total of a defroster blowing port 19 for blowing the air-conditioning air toward a front window glass W of the vehicle, a face blowing port 20 for blowing the air-conditioning air toward the face portion of the passenger, and a foot blowing port 21 for blowing the air-conditioning air toward the foot portion of the passenger are provided at the bottommost stream portion of the air passageway of the case 2.

At the upstream portion of these blowing ports 19 to 21, a defroster door 22, a face door 23, and a foot door 24 are rotatably arranged. These doors 22 to 24 are opened or closed by a common servo motor 25 via a not illustrated link mechanism.

Next, to explain in brief the electrically controlled portion of the present embodiment, an air-conditioning control device 29 is configured by a known microcomputer including a CPU, ROM, RAM, etc. and peripheral circuits thereof. This air-conditioning control device 29 stores a control program for the air-conditioning control in a ROM thereof and performs various operations and processings based on the control program.

Sensor detection signals are input to the input side of the air-conditioning control device 29 from sensor groups 30 to 35, and various operation signals are input from an air-conditioning panel 36 arranged near the instrument panel (not illustrated) of the front portion in the vehicle compartment.

As the sensor group, specifically, provision is made of a vehicle speed sensor 30 for detecting a vehicle speed SPD, an outside air sensor 31 for detecting an outside air temperature (temperature outside the vehicle compartment) Tam, an inside air sensor for detecting an inside air temperature (temperature inside the vehicle compartment) Tr, a sunshine sensor 33 for detecting an amount of sunshine Ts incident upon the vehicle compartment, an evaporator temperature sensor 34 arranged in the air blowing portion of the evaporator 9 and detecting an evaporator blown air temperature Te, a water temperature sensor 35 for detecting the temperature Tw of a warm water (engine cooling water) flowing into the heater core 15, etc.

Figure 2:
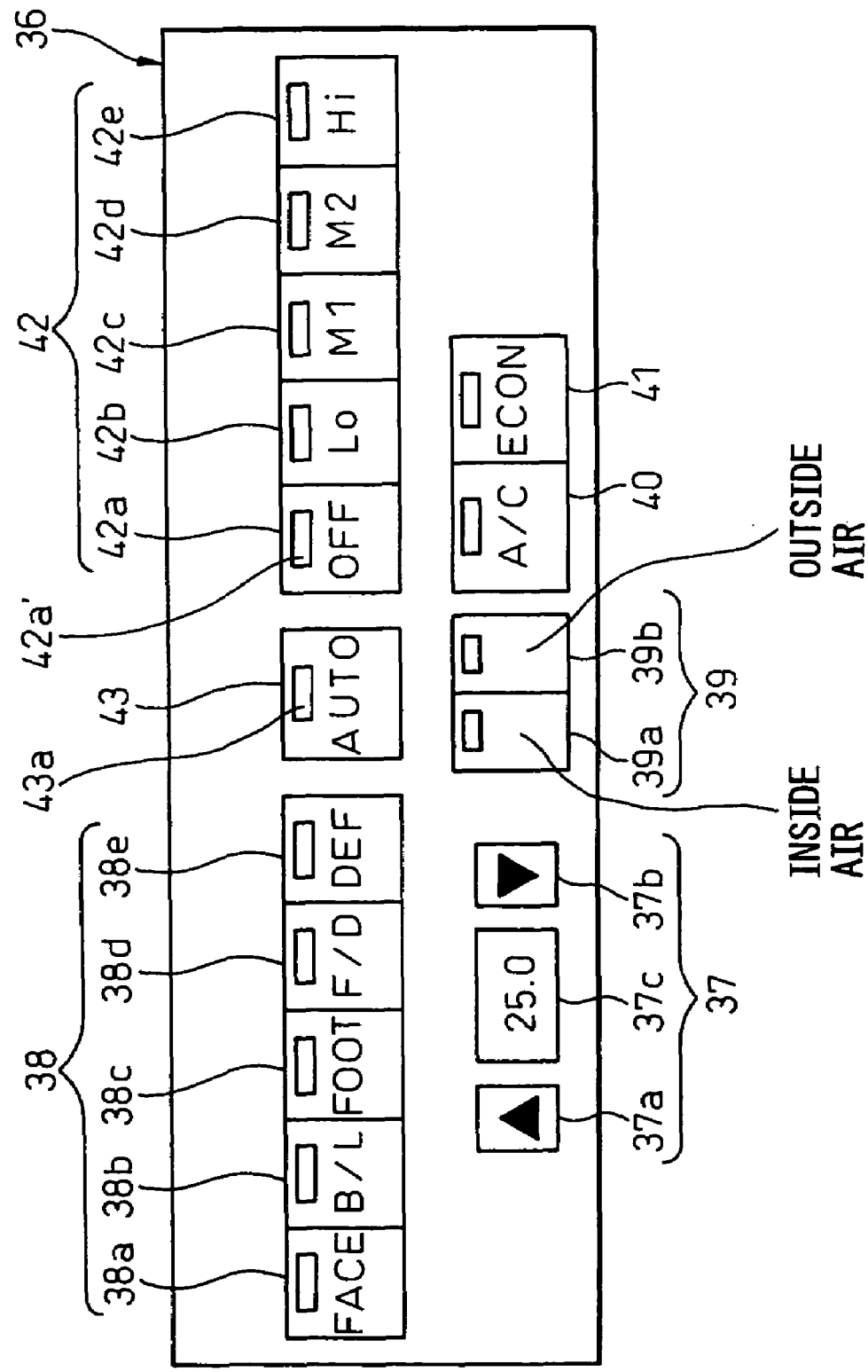
FIG. 2 is a front view of an air-conditioning panel in the first embodiment.

Further, in the air-conditioning panel 36, as various operation switches, switches 37 to 43 shown in FIG. 2 are provided. A temperature setting switch 37 outputs a signal of the set temperature in the vehicle compartment and is provided with a set temperature raising switch 37a, a set temperature lowering switch 37b, and a set temperature display unit 37c.

A blowing mode switch 38 issues a signal for manually setting various blowing modes set by the blowing mode doors 22 to 24 and is provided with a face mode switch 38a, a bilevel mode switch 38b, a foot mode switch 38c, a foot defroster mode switch 38d, and a defroster mode switch 38e.

The inside/outside air switching switch 39 issues a signal for manually setting the inside air mode and the outside air mode by the inside/outside air switch door 6 and is provided with an inside air mode switch 39a and an outside air mode switch 39b.

An air-conditioner switch 40 issues an operation instruction signal (ON signal of the electromagnetic clutch 11a) of the compressor 11. An economy switch 41 issues a signal raising the target evaporator blown air temperature TEO more than that at the time of the turning on the air-conditioner switch 40 to lower the work ratio of the compressor 11.

A blower operation switch 42 issues a signal for manually setting the flow rate of the blower 8 and is provided with an OFF switch 42a for stopping the blower 8, a low flow rate switch 42b, a first intermediate flow rate switch 42c, a second intermediate flow rate switch 42d for a flow rate larger than the first intermediate flow rate by a predetermined amount, and a large flow rate switch 42e.

An automatic switch 43 issues an instruction signal of the air-conditioning automatic control state. When the automatic switch 42 is in the on state, even if the air-conditioner switch 40 and the economy switch 41 are in the OFF state, power is supplied to the electromagnetic clutch 11a, the compressor 11 is set in the operation state, and operations of various air-conditioning equipment are set to the automatically controlled state.

On the output side of the air-conditioning control device 29, the electromagnetic clutch 11a of the compressor 11, servo motors 7, 18, and 25 forming the driving means of equipment, the motor 8b of the blower 8, the motor 12b of the condenser cooling fan 12a, etc. are connected. The operations of these devices are controlled by output signals of the air-conditioning control device 29.

Next, an explanation will be given of the operation of the present embodiment having the above configuration. Explaining in brief the operation of the vehicle compartment air-conditioning unit 1 first, by operating the blower 8, the air introduced from the inside air introduction port 3 or the outside air introduction port 4 is blown in the case 2 toward the inside of the vehicle compartment. Further, by supplying power to the electromagnetic clutch 11a to connect the electromagnetic clutch 11a and driving the compressor 11 by the vehicle engine, the refrigerant circulates in the refrigeration cycle system 10.

The blown air of the blower 8 passes through the evaporator 9 first where it is cooled and dehumidified. This cold air is divided to a flow passing through the heater core 15 and a flow passing through the by bypass 16 next in accordance with the rotational position (opening degree) of the air mix door 17.

Accordingly, the ratio between the flow rate (hot flow rate) of air passing through the heater core 15 and the flow rate (cold flow rate) of air passing through the bypass 16 is adjusted according to the opening degree of the air mix door 17. The temperature of the air blown into the vehicle compartment can be adjusted by this. Then, this temperature adjusted air-conditioning air is blown into the vehicle compartment from one or more of the blowing ports of the defroster blowing port 19, the face blowing port 20, and the foot blowing port 21 positioned at the bottommost stream portion of the air passageway of the case 2 and performs the air-conditioning in the vehicle compartment and the defrosting of the front window glass W of the vehicle.

Figure 3:
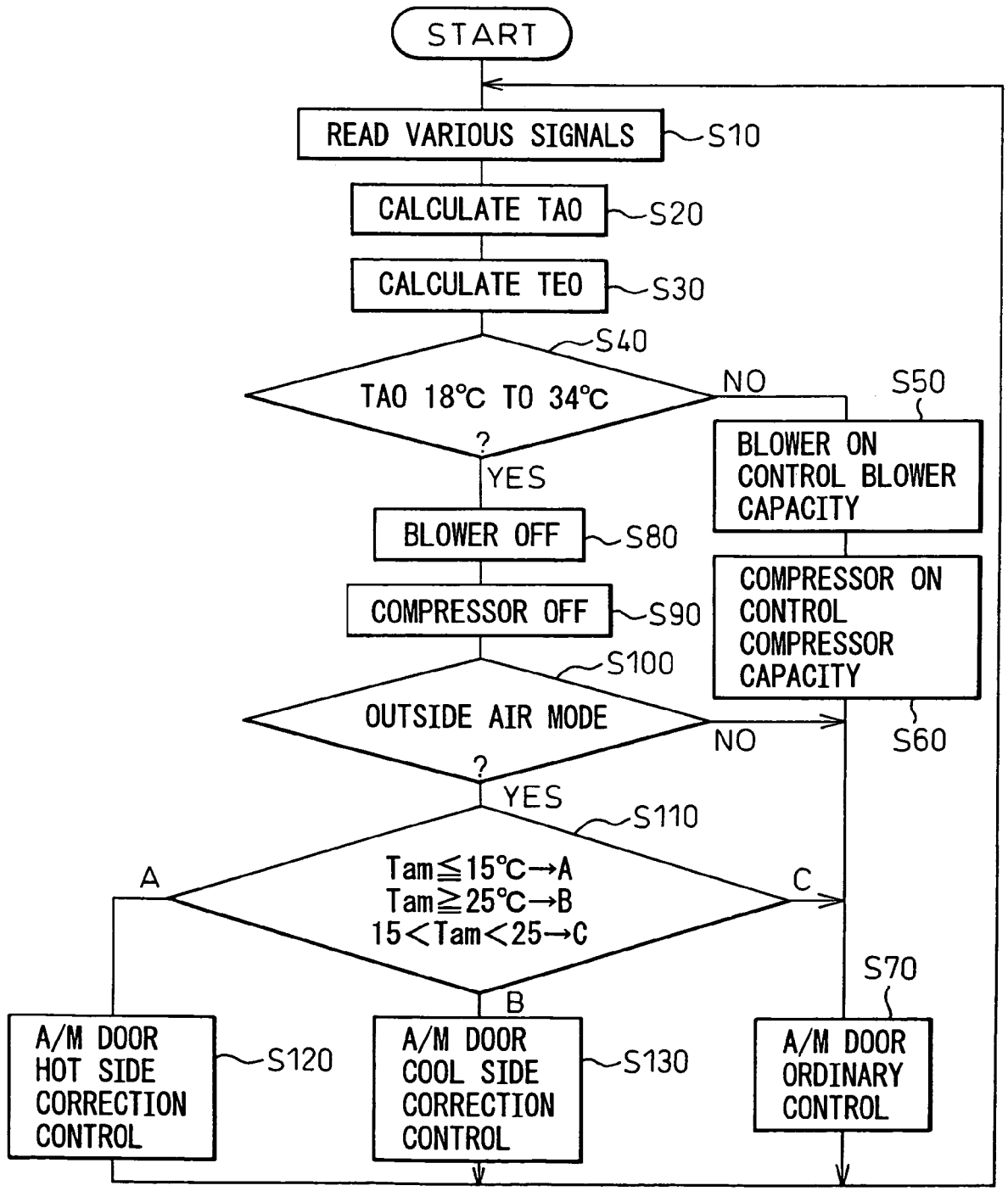
FIG. 3 is a flowchart summarizing the air-conditioning control of the first embodiment.

Next, an explanation will be given of the air-conditioning automatic control according to the present embodiment based on FIG. 3. FIG. 3 is a flowchart of a control routine executed by a microcomputer of the air-conditioning control device 20. This control routine is started by the automatic switch 43 being turned on. At step S10, at first, the detection signals of the sensor groups 30 to 35, various operation signals, etc. are read from the air-conditioning panel 36.

Next, at step S20, the target blown air temperature TAO of air blown into the vehicle compartment is calculated. This target blown air temperature TAO is the blown air temperature in the vehicle compartment required for maintaining the temperature inside the vehicle compartment at the set temperature Tset set by the passenger by the temperature setting switch 37 of the air-conditioning panel 36 irrespective of fluctuation of the air-conditioning heat load. This TAO is calculated according to the following equation (1) based on the set temperature Tset, the outside air temperature Tam, the inside air temperature Tr, and the amount of sunshine Ts:

$$TAO = K_{set} \times T_{set} - K_r \times T_r - K_{am} \times T_{am} - K_s \times T_s + C \quad (1)$$

where, $K_{set}$, $K_r$, $K_{am}$, $K_s$: Control gains

C: Constant for correction

Next, at step S30, the target evaporator blown air temperature TEO is calculated. Here, the target evaporator blown air temperature TEO is a control value determined mainly for the temperature control of the air blown into the vehicle compartment, the defrosting control of the vehicle front surface window glass W, the power-saving (economy) control of the compressor 11, the control of the humidity in the vehicle compartment, etc. and is calculated in accordance with the target blown air temperature TAO, the outside air temperature Tam, the humidity in the vehicle compartment, etc. as is well known.

Next, at step S40, it is judged whether the target blown air temperature TAO is in a predetermined intermediate temperature zone near the set temperature Tset. The predetermined intermediate temperature zone near this set temperature Tset is specifically 18° C. to 34° C.

The set temperature Tset is the temperature felt comfortable by the passenger. Usually a temperature of approximately 25° C. is set. Accordingly, it can be said that this intermediate temperature zone TAO=18° C. to 34° C. is the temperature zone where the air-conditioning heat load of the vehicle compartment air-conditioning unit 1 becomes the minimum.

Here, the air-conditioning heat load of the vehicle compartment air-conditioning unit 1 means the heat amount for cooling or heating the sucked air of the vehicle compartment air-conditioning unit 1 for maintaining the vehicle compartment temperature Tr at the set temperature Tset.

When activating the air-conditioner, for example when the cooler is activated in the summer season, as the temperature in the vehicle compartment can become a high 50° C. or more, at the time of such cooler activation, the target blown air temperature is calculated as the low temperature of −30° C. or less. For this reason, the judgment of step S40 becomes NO.

Further, at the time of activation of the heater in the winter season, since the temperature in the vehicle compartment conversely can become a low 0° C. or less, the target blown air temperature TAO is calculated as a high temperature reaching 90° C. or more when activating the heater. For this reason, the judgment of step S40 becomes NO.

In this way, at the time of startup of the cooler and the time of startup of the heater immediately after the activation of the air-conditioner, the air-conditioning heat load of the vehicle compartment air-conditioning unit 1 becomes very large, and the target blown air temperature TAO is calculated as a high temperature or a low temperature largely apart from the set temperature Tset. Therefore the judgment of step S40 becomes NO, and the routine proceeds to step S50.

At this step S50, the blower 8 is set in the operation (ON) state and, at the same time, the flow rate of the blower 8 is automatically controlled in accordance with the change of the target blown air temperature TAO.

Figure 4:
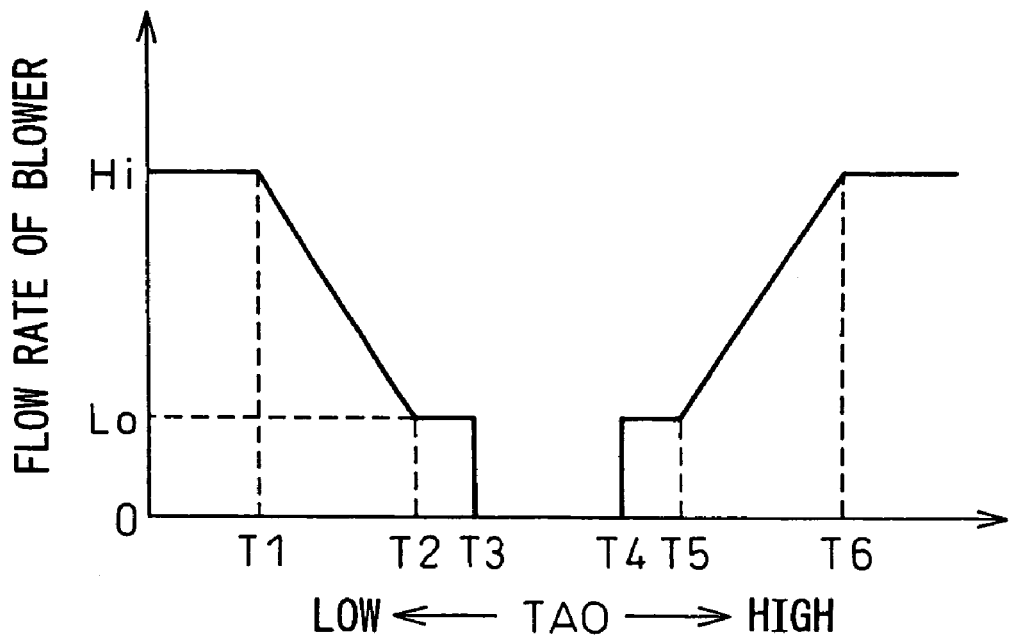
FIG. 4 is a graph of blower control according to the first embodiment.

Explaining this flow rate control specifically based on FIG. 4, at the time of activation of the cooler in the summer season, usually the target blown air temperature TAO is calculated as a temperature lower than the first predetermined temperature T1 (for example −30° C.) of FIG. 4, therefore, the voltage applied to the drive motor 8b of the blower 8 is made the maximum, and the flow rate of the blower 8 is set at the maximum flow rate (Hi).

Then, as the cooling in the vehicle compartment progresses and the temperature in the vehicle compartment (inside air temperature) Tr is lowered, the target blown air temperature TAO rises. When the target blown air temperature TAO rises to the first predetermined temperature T1 or more, the voltage applied to the drive motor 8b of the blower 8 is continuously lowered along with this, and the flow rate of the blower 8 is continuously lowered.

When the target blown air temperature TAO rises up to the second predetermined temperature T2 (for example 8° C.), the flow rate of the blower 8 is lowered to the minimum flow rate (Lo).

Contrary to this, when activating the heater in the winter season, usually the target blown air temperature TAO is calculated as a temperature higher than a sixth predetermined temperature T6 (for example 90° C.) of FIG. 4, therefore the voltage applied to the drive motor 8b of the blower 8 is made the maximum, and the flow rate of the blower 8 is set at the maximum flow rate (Hi).

Note that, in FIG. 4, the maximum flow rate (Hi) on the low temperature side (cooler side) of the target blown air temperature TAO and the maximum flow rate (Hi) of the high temperature side (heater side) of the target blown air temperature TAO are indicated as the same value, but generally the required flow rate is larger at the time of the maximum cooling than the required flow rate at the time of the maximum heating, therefore, in actuality, the maximum flow rate (Hi) of the high temperature side (heater side) of the target blown air temperature TAO is set smaller than the maximum flow rate (Hi) of the low temperature side (cooler side) of the target blown air temperature TAO by a predetermined amount.

Then, as the heating in the vehicle compartment progresses and the temperature in the vehicle compartment (inside air temperature) Tr rises, the target blown air temperature TAO is lowered. When the target blown air temperature TAO is lowered to the sixth predetermined temperature T6 or less, the voltage applied to the drive motor 8b of the blower 8 is continuously lowered along with this and the flow rate of the blower 8 is continuously lowered.

When the target blown air temperature TAO is lowered to a fifth predetermined temperature T5 (for example 44° C.), the flow rate of the blower 8 is lowered to the minimum flow rate (Lo).

In FIG. 3, at the next step S60, the compressor 11 is set to the operation (ON) state and, at the same time, the capacity of the compressor 11 is controlled. Specifically, the capacity of the compressor 11 is controlled so that the blown air temperature Te (detected temperature of the temperature sensor 34) of the evaporator 9 becomes the target evaporator blown air temperature TEO.

Figure 5:
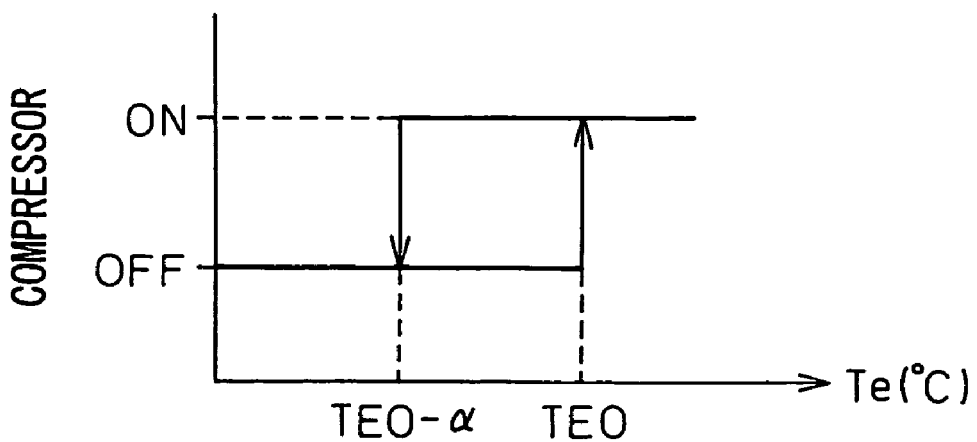
FIG. 5 is a graph of intermittent control of a fixed volume compressor according to the first embodiment.
Figure 10:
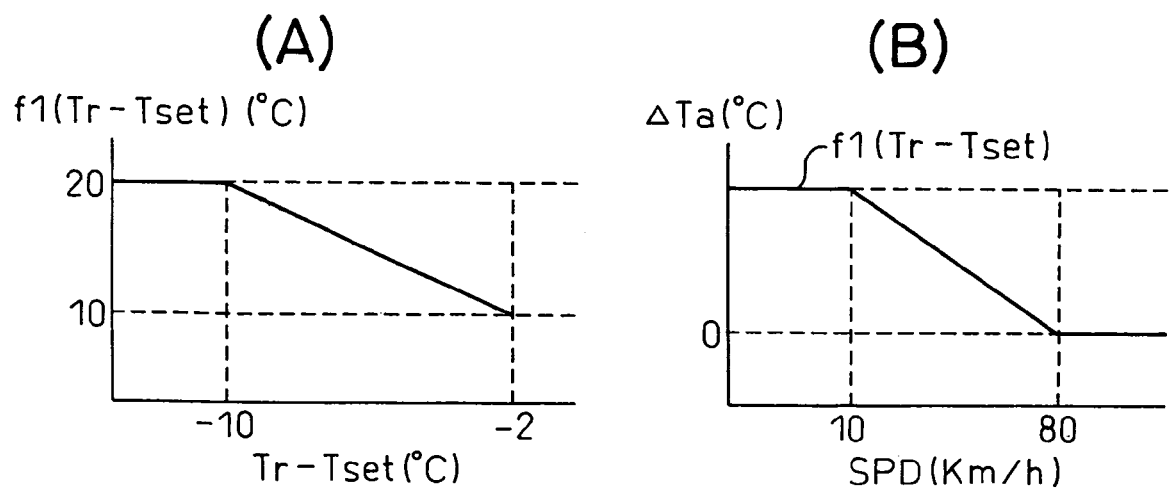
FIGS. 10(A) and (B) are graphs of the TAO correction amount for correcting an opening degree of the air mix door according to a third embodiment and show a case where the inside air temperature is lower than a set temperature.
Figure 11:
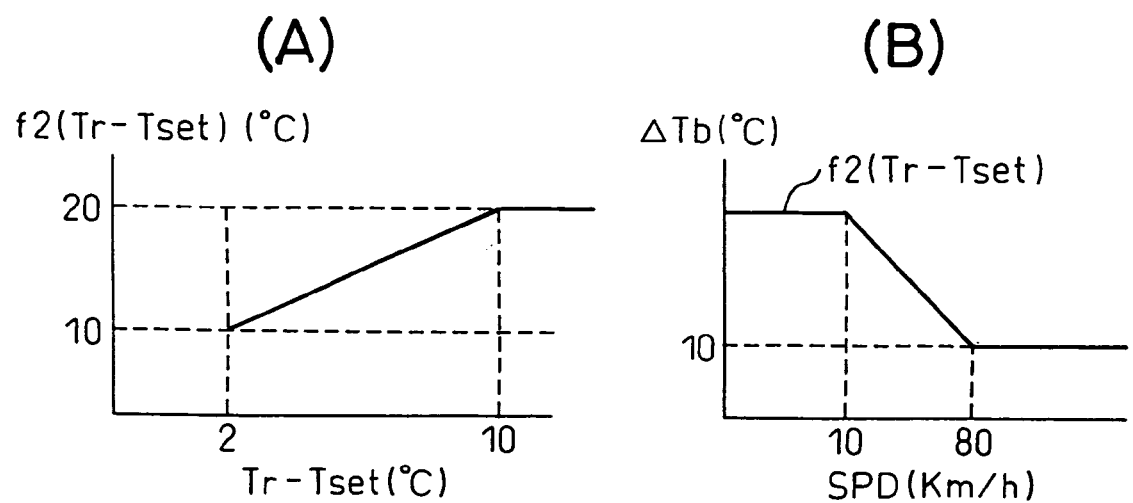
FIGS. 11(A) and (B) are graphs of the TAO correction amount for correcting an opening degree of the air mix door according to the third embodiment and show a case where the inside air temperature is higher than a set temperature.

In the present embodiment, use is made of a fixed volume compressor always operating with a constant discharge volume as the compressor 11, therefore, specifically, the operation of the compressor 11 is intermittently controlled as shown in FIG. 5. Namely, when the actual blown air temperature Te of the evaporator 9 rises up to the target evaporator blown air temperature TEO, the power is supplied to the electromagnetic clutch 11a to set the compressor 11 in the operation state, while when the actual blown air temperature Te of the evaporator 9 is lowered to the target evaporator blown air temperature TEO-α, the supply of the power to the electromagnetic clutch 11a is shut off and the compressor 11 is set in the stopped (OFF) state. Here, α is a hysteresis width for preventing hunting and for example is about 1° C.

In this way, by intermittently controlling the operation of the compressor 11, the work ratio of the compressor 11, consequently the refrigerant exhaust capacity, is controlled, and the actual blown air temperature Te of the evaporator 9 is maintained near the target evaporator blown air temperature TEO.

Specifically, between a first target evaporator blown air temperature TEOa having a characteristic of falling in response to the lowering of the target blown air temperature TAO and a second target evaporator blown air temperature TEOb having a characteristic of falling in the low temperature zone and the high temperature zone of the outside air temperature Tam and rising in the intermediate temperature zone of the outside air temperature Tam, the lower temperature is finally determined as the target evaporator blown air temperature TEO.

Note that, a third target evaporator blown air temperature TEOc determined in accordance with the humidity in the vehicle compartment is calculated for controlling the humidity in the vehicle compartment. Among the first, second, and third target evaporator blown air temperatures TEOa, TEOb, and TEOc, the lowest temperature may be finally determined as the target evaporator blown air temperature TEO as well.

At the next step S70, the ordinary opening degree control of the air mix door 17 is carried out. Specifically, a target opening degree SW of the air mix door 17 is calculated according to the following equation (2) based on the target blown air temperature TAO, the evaporator blown air temperature Te detected by the evaporator temperature sensor 34, and the hot water temperature Tw detected by the water temperature sensor 44:

$$SW=\{(TAO-Te)/(Tw-Te)\}\times 100(\%) \qquad (2)$$

Then, the servo motor 18 drives and controls the air mix door 17 so that the actual opening degree of the air mix door 17 becomes the target opening degree SW. By this, the opening degree of the air mix door 17 is controlled so that the blown air temperature into the vehicle compartment becomes the target blown air temperature TAO, and the vehicle compartment temperature Tr is maintained at the set temperature Tset.

Here, the "ordinary opening degree control" of the air mix door 17 means that the correction as will be explained later is not carried out with respect to the target blown air temperature TAO calculated at step S30 as shown in the above equation (2), but the calculated value of the TAO is used as it is to calculate the target opening degree SW.

Note that SW=0(%) is the maximum cooling position of the air mix door 17, wholly opens the bypass 16, and wholly closes the air passageway on the heater core 15 side. Contrary to this, SW=100(%) is the maximum heating position of the air mix door 17, wholly closes the bypass 16, and wholly opens the air passageway of the heater core 15 side.

In the intermediate seasons of the spring and autumn, the heat load of the air-conditioning in the vehicle compartment is inherently small, therefore, even if the flow rate of the blower 8 is lowered to the minimum flow rate (Lo), the vehicle compartment temperature (inside air temperature) Tr can be maintained near the set temperature Tset set by the passenger. Under such an air-conditioning heat load condition, the target blown air temperature TAO is within the range of the predetermined intermediate temperature zone (18° C. to 34° C.) near the set temperature Test.

In this case, the judgment of step S40 of FIG. 3 becomes YES, so the routine proceeds to step ST80, the supply of the power to the drive motor 8b of the blower 8 is shut off, and the blower 8 is completely stopped. Then, the supply of the power to the electromagnetic clutch 11a is maintained in the disconnected state at step S90, and the compressor 11 is maintained in the perfectly stopped state.

By this, the inside of the vehicle compartment can be set to a silent environment with absolutely no blower noise, the comfort in the vehicle compartment can be improved, and, at the same time, the effects of the reduction of the power consumption of the blower 8 and the reduction of the drive power of the compressor 11 can be exhibited. In addition, by judging the situation where the heat load of the air-conditioning in the vehicle compartment is small, control for automatically stopping the blower 8 and the compressor 11 is carried out, so manual operation of the passenger is not required and no operation load is placed on the passenger.

Further, the predetermined temperature range (for example 18° C. to 34° C.) within the temperature range from the second predetermined temperature T2 to the fifth predetermined temperature T5 (for example 8° C. to 44° C.) making the flow rate of the blower 8 the minimum flow rate (Lo) is made a range where the heat load of the air-conditioning in the vehicle compartment becomes the minimum. In this air-conditioning heat load minimum range, the blower 8 and the compressor 11 are automatically stopped, therefore when the stopped state of the blower 8 and the compressor 11 is maintained and the target blown air temperature TAO fluctuates to the outside of the air-conditioning heat load minimum range (for example, 18° C. to 34° C.), the blower 8 is reliably reactivated with the minimum flow rate.

Accordingly, giving the passenger the uncomfortable feeling of abruptly reactivating the blower 8 with a flow rate higher than the minimum flow rate can be reliably avoided. This can also contribute to the improvement of the comfort of the passenger.

Next, at step S100, it is judged if the air suction mode by the inside/outside air switch door 6 is the outside air mode. If the inside air mode, the routine proceeds to step S70 mentioned above, and the "ordinary opening degree control" of the air mix door 17 is carried out. That is, if the inside air mode, there is no outside air flow due to the vehicle operation dynamic pressure, so no air-conditioning air is blown into the vehicle compartment along with stopping of the blower 8. For this reason, it is not necessary to perform the "opening degree correction control" of the air mix door 17, so the "ordinary opening degree control" of the air mix door 17 is carried out at step S70.

In contrast, if the outside air mode, the routine proceeds to step S110, where it is judged whether the outside air temperature Tam is high or low. Specifically, it is judged whether the outside air temperature Tam is in a low outside air temperature zone not more than a first predetermined temperature (specifically 15° C.), a high outside air temperature zone not less than a second predetermined temperature (specifically 25° C.) higher than the first predetermined temperature by a predetermined temperature, or an intermediate temperature zone (higher than 15° C. and lower than 25° C.) between the first predetermined temperature and second predetermined temperature.

Here, the intermediate temperature zone is a temperature range in which the inside of the vehicle compartment can be substantially maintained near the set temperature Tset by the introduction of the outside air, therefore when the outside air temperature tam falls in the intermediate temperature zone (when the judgment result is C), the routine proceeds to step S70, where the "ordinary opening degree control" of the air mix door 17 is carried out.

On the other hand, when the outside air temperature Tam falls in the low outside air temperature zone not more than the first predetermined temperature (specifically 15° C.) (when the judgment result is A), the routine proceeds to step S120, where the "HOT side opening degree correction control" of the air mix door 17 is carried out.

Further, when the outside air temperature Tam falls in the high outside air temperature zone not less than the second predetermined temperature (specifically 25° C.) (when the judgment result is B), the routine proceeds to step S130, where the "COOL side opening degree correction control" of the air mix door 17 is carried out.

The opening degree correction control of the HOT side and the COOL side of the air mix door 17 will be explained in detail below. The low outside air temperature zone where the outside air temperature Tam is not more than the first predetermined temperature (specifically 15° C.) is the heating region. The blower 8 is automatically stopped in this heating region. When the flow rate of air blown of the outside air-conditioning air (warm air) due the operation dynamic pressure is smaller than the amount of air blown when the blower 8 operates at low speed (Lo), the heating capacity in the vehicle compartment is insufficient for the required capacity, therefore the temperature in the vehicle compartment gradually falls from the set temperature. This becomes a cause of shortening the automatic stopping period of the blower 8.

Therefore, in the present embodiment, by performing control for correcting the opening degree of the air mix door 17 to the HOT side (high temperature side) in the low outside air temperature zone, the shortage of the heating capacity in the vehicle compartment when the blower 8 is automatically stopped is compensated for and a longer automatic stopping period of the blower 8 is achieved.

The control for correcting the opening degree of the air mix door 17 to the HOT side specifically calculates the target opening degree SWa of the air mix door 17 according to the following equation (3) and controls the opening degree of the air mix door 17 to this target opening degree SWa:

$$SWa = \{(TAOa - Te)/(Tw - Te)\} \times 100 (\%) \quad (3)$$

where, TAOa=TAO+ΔTa

Note that TAO is the target blown air temperature calculated according to the above equation (2), and ΔTa is the correction amount for correcting TAO to the high temperature side and determined based on the maps (graphs) of FIGS. 6(A) and 6(B).

The maps of FIGS. 6(A) and 6(B) are prepared in advance, based on experiment etc., and are stored in the memory device (ROM) of the microcomputer of the air-conditioning control device 29. Note that the maps (graphs) of FIGS. 7(A) and 7(B) to FIGS. 11(A) and 11(B) explained later are also stored in the memory device (ROM) in the same way as above.

As shown in FIG. 6(A), when the outside air temperature Tam is 15° C. or less, the correction amount f1 (Tam) is made to increase as the outside air temperature Tam falls from 15° C. Then, when the outside air temperature Tam falls to 0° C., the correction amount f1 (Tam) reaches the upper limit value (20° C.).

The map of FIG. 6(B) is to further correct the correction amount f1 (Tam) in accordance with this outside air temperature Tam by the vehicle speed SPD so as to determine the final correction amount ΔTa. In FIG. 6(B), in the speed range where the vehicle speed=80 km/h or more, the flow rate of outside air introduced by the vehicle operation dynamic pressure becomes the flow rate of air blown by low speed (Lo) operation of the blower 8 or more, so the correction amount ΔTa is made 0.

The flow rate of introduction of the outside air by the vehicle operation dynamic pressure is reduced along with the fall of the vehicle speed, therefore the correction amount ΔTa is increased along with the fall of the vehicle speed. At the time of low speed operation where the vehicle speed is 10 km/h or less, the correction amount ΔTa is made equal to the correction amount f1 (Tam), and the correction amount ΔTa is made the maximum.

Due to this, the lower the outside air temperature and the lower the vehicle speed, the larger the correction amount ΔTa, so the target opening degree SWa of the opening degree of the air mix door can be corrected to the HOT side (maximum heating side). For this reason, the blown air (warm air) temperature in the vehicle compartment can be corrected to the high temperature side, so the shortage of the flow rate of air blown in the vehicle compartment when the blower 8 is automatically stopped is compensated for and the automatic stopping period of the blower 8 can be prolonged.

Next, explaining the control for correcting the opening degree of the air mix door 17 to the COOL side, the target opening degree SWb of the air mix door 17 is calculated according to the following equation (4), and the opening degree of the air mix door 17 is controlled so as to coincide with this target opening degree SWb:

$$SWb = \{(TAOb - Te)/(Tw - Te)\} \times 100 (\%) \quad (4)$$

where, TAOb=TAO−ΔTb

Note that, TAO is the target blown air temperature calculated according to equation (2), and ΔTb is the correction amount for correcting TAO to the low temperature side and determined based on the maps of FIGS. 7(A) and 7(B).

As shown in FIG. 7(A), when the outside air temperature Tam is 25° C. or more, the correction amount f2 (Tam) is made to increase as the outside air temperature Tam rises from 25° C. Then, when the outside air temperature rises up to 30° C., the correction amount f2 (Tam) reaches the upper limit value (20° C.).

The map of FIG. 7(B) is to further correct the correction amount f2 (Tam) in accordance with this outside air temperature Tam by the vehicle speed SPD so as to determine the final correction amount ΔTb. In FIG. 7(B), in the speed range where the vehicle speed=80 km/h or more, the flow rate of introduction of the outside air by the vehicle operation dynamic pressure becomes the flow rate of air blown by the low speed (Lo) operation of the blower 8 or more, but when the outside air temperature Tam is 25° C. or more, the correction amount ΔTb is not made 0, but made 10° C. (minimum value).

This is because when the outside air temperature Tam is 25° C. or more, it is the cooling zone, and it is necessary to cool the introduced outside air, but when the blower 8 is automatically stopped, the compressor 11 is automatically stopped linked with this, and the evaporator 9 stops the cooling action.

The flow rate of introduction of the outside air is reduced together with the fall of the vehicle speed, therefore, the correction amount ΔTb is increased along with the fall of the vehicle speed. At the time of low speed operation when the vehicle speed is 10 km/h or less, the correction amount ΔTb is made equal to the correction amount f2 (Tam), and the correction amount ΔTb is made the maximum.

Due to this, the higher the outside air temperature and the lower the vehicle speed, the larger the increased correction amount ΔTb, so the target opening degree SWb of the air mix door can be corrected to the COOL side (maximum cooling side). For this reason, the blown air (cool air) temperature in the vehicle compartment can be corrected to the low temperature side, so the shortage of the flow rate of air blown into the vehicle compartment when the blower 8 is automatically stopped is compensated for and the automatic stopping period of the blower 8 can be prolonged.

Explaining the correspondence between the specific means in the first embodiment and the components of the present invention, steps S50 and S80 of FIG. 3 configure the "blower controlling means for automatically controlling the operation of the blower 8".

Further, steps S70, S120, and S130 of FIG. 3 configure the "blown air temperature controlling means for automatically controlling the operation position (opening degree of the air mix door 17) of the temperature adjusting means".

Then, among steps S70, S120, and S130 of FIG. 3, steps S120 and S130 configure the "correcting means for correcting the operation position (the opening degree of the air mix door 17) of the temperature adjusting means when the outside air mode is selected when the blower 8 is automatically stopped".

Second Embodiment

In the first embodiment, the level of the outside air temperature Tam was judged, the target opening degree SWa of the opening degree of the air mix door was corrected to the HOT side (maximum heating side) at the time of a low outside air temperature, and the target opening degree SWb of the opening degree of the air mix door was corrected to the COOL side (maximum cooling side) at the time of a high outside air temperature, but in the second embodiment, at step S110 of FIG. 3, the level of the inside air temperature Tr is judged in place of the outside air temperature Tam and control is performed for correction of the opening degree of the air mix door.

In the second embodiment, when the inside air temperature Tr is not more than the first predetermined temperature (for example 20° C.), the routine proceeds from step ST110 to step S120, where the target opening degree SWa of the opening degree of the air mix door is corrected to the HOT side (maximum heating side).

Specifically, as shown in FIG. 8(A), when the inside air temperature Tr is 20° C. or less, the correction amount f1 (Tr) is made to continuously increase from 10° C. as the inside air temperature Tr falls from 20° C. Then, when the inside air temperature Tr falls to 15° C., the correction amount f1 (Tr) reaches the upper limit value (20° C.).

The map of FIG. 8(B) is to further correct the correction amount f1 (Tr) in accordance with this inside air temperature Tr by the vehicle speed SPD so as to determine the final correction amount Ta. It is the same as that of FIG. 6(B) mentioned above, so a specific explanation will be omitted.

By FIGS. 8(A) and 8(B), the lower the inside air temperature and the lower the vehicle speed, the more the correction amount Ta can be increased.

At step S120, in the same way as the first embodiment, TAOa is made equal to TAO+ΔTa, and the target opening degree SWa is calculated by equation (3). By this, at the time of a low inside air temperature, the target opening degree SWa of the air mix door can be corrected to the HOT side (maximum heating side). For this reason, the blown air (hot air) temperature in the vehicle compartment can be corrected to the high temperature side, so the shortage of the flow rate of air blown into the vehicle compartment when the blower 8 is automatically stopped is compensated for, and the automatic stopping period of the blower 8 can be prolonged.

Further, in the second embodiment, when the inside air temperature Tr is not less than a second predetermined temperature (for example 25° C.) higher than the first predetermined temperature (for example 20° C.) by a predetermined value, the routine proceeds from step ST110 to step S130 of FIG. 3, where the target opening degree SWb of the air mix door is corrected to the COOL side (maximum cooling side).

Specifically, as shown in FIG. 9(A), when the inside air temperature Tr is 25° C. or more, the correction amount f2 (Tr) is made to continuously increase as the inside air temperature Tr rises from 25° C. Then, when the inside air temperature Tr rises up to 30° C., the correction amount f2 (Tr) reaches the upper limit value (20° C.).

The map of FIG. 9(B) is to further correct the correction amount f2 (Tr) in accordance with this inside air temperature Tr by the vehicle speed SPD so as to determine the final correction amount Tb. It is the same as that of FIG. 7(B) mentioned above, so a specific explanation will be omitted.

At step S130, in the same way as the first embodiment, TAOb is made equal to TAO−ΔTb, and the target opening degree SWb is calculated by equation (4). By this, at the time of a high inside air temperature, the target opening degree SWa of the air mix door can be corrected to the COOL side (maximum cooling side). For this reason, the blown air temperature (cool air) temperature into the vehicle compartment can be corrected to the low temperature side, so the shortage of the amount of air blown into the vehicle compartment when the blower 8 is automatically stopped is compensated for, and the automatic stopping period of the blower 8 can be prolonged.

Note that, in the second embodiment, when the inside air temperature Tr is in the intermediate temperature zone between a first predetermined temperature (for example 20° C.) and a second predetermined temperature (for example 25° C.), the routine proceeds from step ST110 to step S70 of FIG. 3, where ordinary control of the opening degree of the air mix door is carried out.

Third Embodiment

In the above first and second embodiments, the level of the outside air temperature Tam or the inside air temperature Tr is judged, the target opening degree SWa of the air mix door is corrected to the HOT side (maximum heating side) at the time of a low outside air temperature or the time of a low inside air temperature, and the target opening degree SWb of the air mix door is corrected to the COOL side (maximum cooling side) at the time of a high outside air temperature or the time of a high inside air temperature, but in the third embodiment, at step S110 of FIG. 3, in place of the outside air temperature Tam and the inside air temperature Tr, the magnitude of the temperature difference between the inside air temperature Tr and the set temperature Tset (Tr′−Tset) is judged, and control is performed for correction of the opening degree of the air mix door.

In the third embodiment, when the inside air temperature Tr is lower than the set temperature Tset (Tr<Tset) and the temperature difference (Tr−Tset) is a value not more than a predetermined minus value (for example −2° C.), the routine proceeds from step ST110 to step S120 of FIG. 3, where the target opening degree SWa of the air mix door is corrected to the HOT side (maximum heating side).

Specifically, as shown in FIG. 10(A), when the temperature difference (Tr−Tset) is a value on the minus side not more than −2° C., the correction amount f1 (Tr−Tset) is made to continuously increase from 10° C. as the temperature difference (Tr−Tset) shifts from −2° C. to the further minus side. Then, when the temperature difference (Tr−Tset) falls to −10° C., the correction amount f1 (Tr−Tset) reaches the upper limit value (20° C.).

The map of FIG. 10(B) is to further correct the correction amount f1 (Tr−Tset) in accordance with this temperature difference (Tr−Tset) by the vehicle speed SPD so as to determine the final correction amount ΔTa. It is the same as those of FIG. 6(B) and FIG. 8(B), so a specific explanation will be omitted.

From FIGS. 10(A) and 10(B), the lower the inside air temperature Tr from the set temperature Tset and the lower the vehicle speed, the more the correction amount ΔTa can be increased.

At step S120, in the same way as the first and second embodiments, TAOa is made equal to TAO+ΔTa, and the target opening degree SWa is calculated by equation (3). Due to this, the lower the inside air temperature Tr from the set temperature Tset, the more the target opening degree SWa of the air mix door can be corrected to the HOT side (maximum heating side). For this reason, the blown air (warm air) temperature into the vehicle compartment can be corrected to the high temperature side, so the shortage of the amount of air blown in the vehicle compartment when the blower 8 is automatically stopped is compensated for, and the automatic stopping period of the blower 8 can be prolonged.

In the third embodiment, when the inside air temperature Tr is higher than the set temperature Tset (Tr>Tset), and the temperature difference (Tr−Tset) is a value not less than a predetermined plus value (for example 2° C.), the routine proceeds from step ST110 to step S130 of FIG. 3, where the target opening degree SWb of the air mix door is corrected to the COOL side (maximum cooling side).

Specifically, as shown in FIG. 11(A), when the temperature difference (Tr−Tset) is a plus value of 2° C. or more, the correction amount f2 (Tr−Tset) is made to continuously increase from 15° C. as the temperature difference (Tr−Tset) becomes further larger to the plus side from 2° C. Then, when the temperature difference (Tr−Tset) increases to the plus side up to 20° C., the correction amount f2 (Tr−Tset) reaches the upper limit value (20° C.).

The map of FIG. 11(B) is to further correct the correction amount f2 (Tr−Tset) in accordance with this temperature difference (Tr−Tset) by the vehicle speed SPD so as to determine the final correction amount ΔTb. It is the same as those of FIG. 7(B) and FIG. 9(B) mentioned above, so a specific explanation will be omitted.

From FIGS. 11(A) and 11(B), the higher the inside air temperature Tr from the set temperature Tset and the lower the vehicle speed, the more correction amount ΔTb can be increased.

At step S130, in the same way as the first and second embodiments, TAOb is made equal to TAO−ΔTb, and the target opening degree SWb is calculated by equation (4). By this, the higher the inside air temperature Tr from the set temperature Tset, the more the target opening degree SWa of the air mix door can be corrected to the COOL side (maximum cooling side). For this reason, the blown air (cool air) temperature into the vehicle compartment can be corrected to the low temperature side, so the shortage of the amount of air blown in the vehicle compartment when the blower 8 is automatically stopped is compensated for, and the automatic stopping period of the blower 8 can be prolonged.

Modifications to the First to Third Embodiments

The present invention is not limited to the above embodiments. The following modifications are possible as exemplified below.

(1) In the above embodiments, as the temperature adjusting means of the blown air temperature into the vehicle compartment, use was made of the air mix door 17 for adjusting the flow rate ratio of the cool and warm air, but a known hot water valve for adjusting the flow rate and the temperature of the hot water flowing into the heater core 15 can be used as the temperature adjusting means of the blown air into the vehicle compartment as well.

(2) In the above embodiments, in the control for correction of the opening degree of the air mix door, the correction amounts ΔTa and ΔTb were calculated based on the outside air temperature Tam, the inside air temperature Tr, the vehicle speed SPD, etc. and the target blown air temperature TAO was corrected by these correction amounts ΔTa and ΔTb so as to perform control for the correction of the opening degree of the air mix door, but it is also possible to directly correct the target opening degrees SWa and SWb of the opening degree of the air mix door by the correction amounts ΔTa and ΔTb and perform the control for correction of the opening degree of the air mix door by that.

(3) In the above embodiments, the heat load minimum range of the air-conditioning in the vehicle compartment was judged based on the target blown air temperature TAO at step S40 and control for automatically stopping the blower 8 was carried out at step S80, but it is also possible to judge the heat load minimum range of the air-conditioner by using the temperature (inside air temperature) Tr in the vehicle compartment and the amount of sunshine Ts in place of the target blown air temperature TAO.

Further, it is also possible to judge the heat load minimum range of the air-conditioning by using the outside air temperature Tam and the amount of sunshine Ts in place of the target blown air temperature TAO. Further, it is also possible to judge the heat load minimum range of the air-conditioning by only the outside air temperature Tam without considering the amount of sunshine Ts. For example, it is also possible to judge the time when the outside air temperature Tam is within the comfortable temperature range of the passenger (for example range of 10° C. to 20° C.) as the heat load minimum range of the air-conditioning.

Further, it is also possible to judge the heat load minimum range of the air-conditioning by using the temperature difference between the vehicle compartment temperature Tr and the set temperature Tset and to judge the heat load minimum range of the air-conditioning by using the temperature difference between the outside air temperature Tam and the set temperature Tset, in place of the target blown air temperature TAO.

Fourth Embodiment

Figure 12:
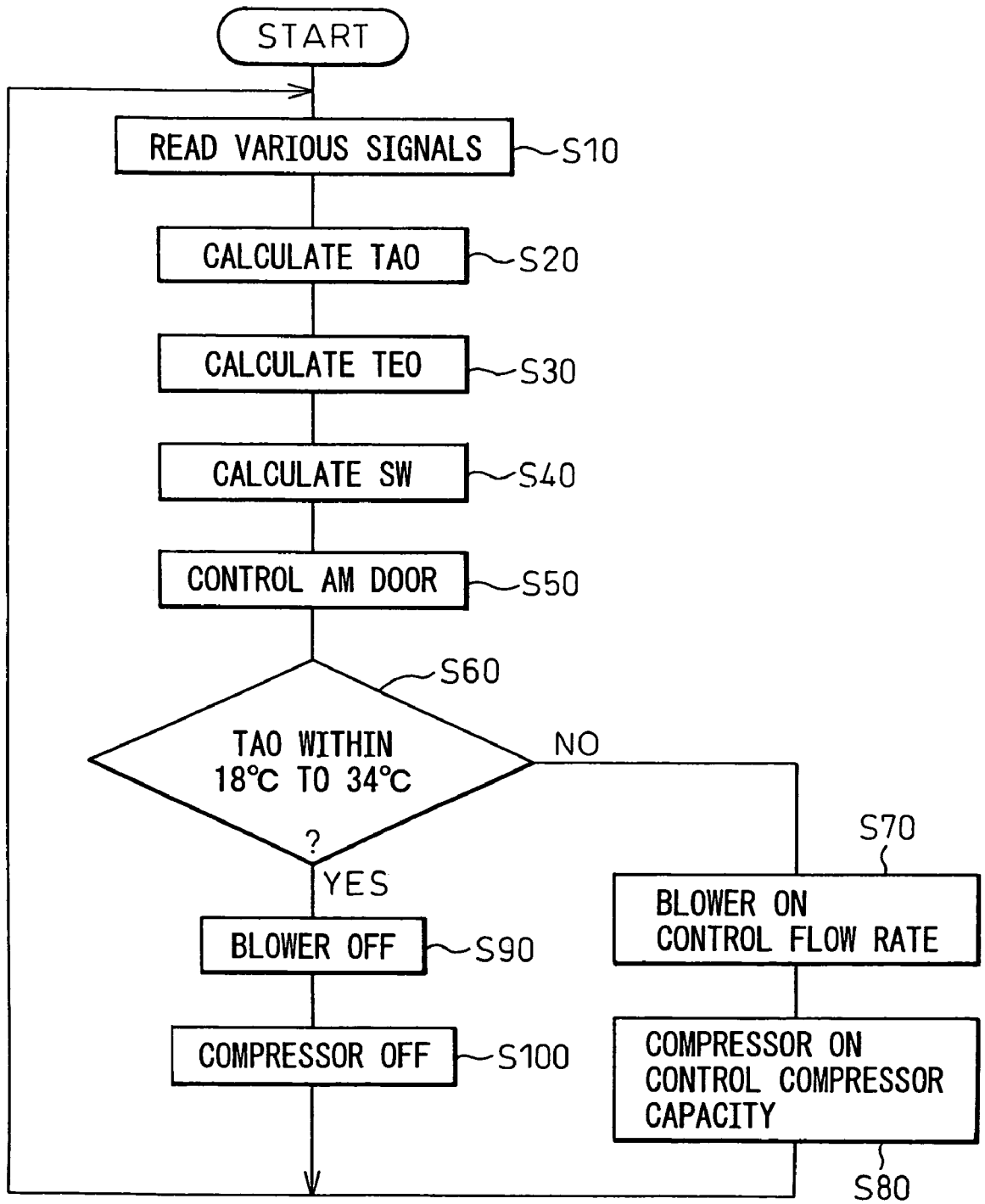
FIG. 12 is a flowchart summarizing the air-conditioning control of a fourth embodiment.

In the fourth embodiment, as shown in FIG. 12, the flow of the air-conditioning automatic control is different from that of the first embodiment. The configuration of the air-conditioner is the same as the configuration of the first embodiment shown in FIG. 1 and FIG. 2, so the explanation will be omitted. Below, an explanation will be given of only the difference between the present embodiment and the first embodiment.

Figure 13:
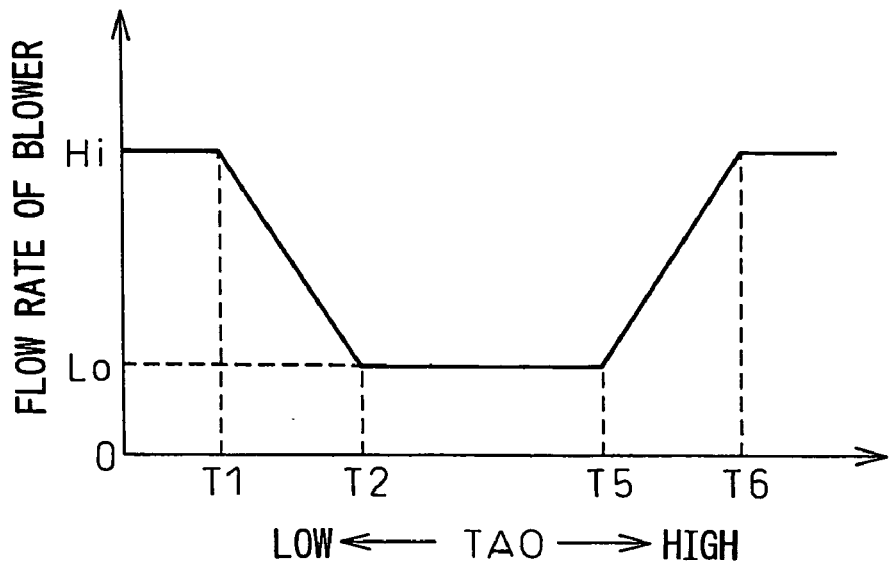
FIG. 13 is a graph of blower control according to the prior art.

Note that FIG. 13 is a graph showing the relationship between the target blown air temperature TAO and the flow rate of the blower 8 according to the prior art. During the period where the target blown air temperature TAO is within the temperature range from the second predetermined temperature T2 to the fifth predetermined temperature T5, the blower maintains the operation state at the minimum flow rate (Lo).

Explaining the correspondence between the specific means in the fourth embodiment and the components of the present invention, step S60 of FIG. 12 configures the "judging means for judging that the air-conditioning heat load is within a minimum range not more than a predetermined amount".

Further, step S90 of FIG. 12 configures the "blower stopping means for automatically stopping the blower 8 for blowing the air toward the inside of the vehicle compartment when judging that the air-conditioning heat load is within the minimum range".

Further, step S100 of FIG. 12 configures the "compressor stopping means for automatically stopping the compressor 11 when judging that the air-conditioning heat load is within the minimum range".

Further, steps S40 and S50 of FIG. 12 configure the "temperature controlling means for automatically controlling the air mix door (temperature adjusting means) 17 so that the temperature of the air blown into the vehicle compartment becomes the target blown air temperature (TAO)".

Then, step S70 of FIG. 12 configures the "blower controlling means for automatically controlling the flow rate of the air blown into the vehicle compartment in accordance with the target blown air temperature (TAO) when the air-conditioning heat load is out of the minimum range".

Further, step S80 of FIG. 12 configures the "compressor controlling means for controlling the capacity of the compressor 11 so that the blown air temperature Te of the evaporator (cooling use heat exchanger) becomes the target evaporator blown air temperature TEO.

Fifth Embodiment

In the fourth embodiment, the heat load minimum range of the air-conditioning in the vehicle compartment was judged based on the target blown air temperature TAO, but in the fifth embodiment, the heat load minimum range of the air-conditioning is judged by using the temperature in the vehicle compartment (inside air temperature) Tr and the amount of sunshine Ts in place of the target blown air temperature TAO.

Figure 14:
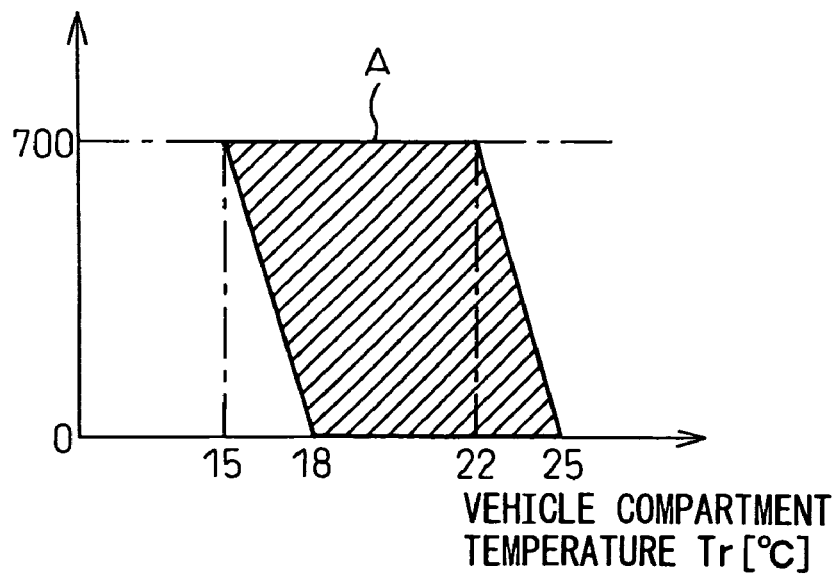
FIG. 14 is an explanatory view of a judgment condition for control for automatically stopping a blower according to a fifth embodiment.

FIG. 14 shows a specific example of the judgment method of the fifth embodiment. The temperature range where the passenger feels comfortable (specifically range of from 18° C. to 25° C.) is set as the temperature Tr in the vehicle compartment when there is no sunshine striking the vehicle compartment. The comfortable temperature range shifts to the low temperature side as the amount of sunshine increases to compensate for the influence of the sunshine. This is shown by the hatching range A of FIG. 14.

In the fifth embodiment, the time when the temperature Tr in the vehicle compartment is in hatching range A of FIG. 14 is judged as the heat load minimum range of the air-conditioning, and the control for automatically stopping the blower 8 and the compressor 11 is carried out. Even if such a judgment method is employed, the same actions and effects as those of the first embodiment can be exhibited.

When the temperature Tr in the vehicle compartment is out of the hatching range A and when the amount of sunshine is not less than the upper limit value of the hatching range A of FIG. 14 (for example 700 W/m$^2$), the blower 8 and the compressor 11 are operated and the controls of S70 and S80 of FIG. 12 are carried out.

Note that, as a modification of the fifth embodiment, it is also possible to judge the heat load minimum range of the air-conditioning by only the temperature Tr in the vehicle compartment without considering the amount of sunshine Ts. For example, it is also possible to judge the time when the temperature Tr in the vehicle compartment is within the comfortable temperature range of the passenger (for example range of from 15° C. to 25° C.) as the heat load minimum range of the air-conditioning.

Sixth Embodiment

In the fourth embodiment, the heat load minimum range of the air-conditioning in the vehicle compartment was judged based on the target blown air temperature TAO, but in the sixth embodiment, the heat load minimum range of the air-conditioning is judged by using the outside air temperature Tam and the amount of sunshine Ts in place of the target blown air temperature TAO.

Figure 15:
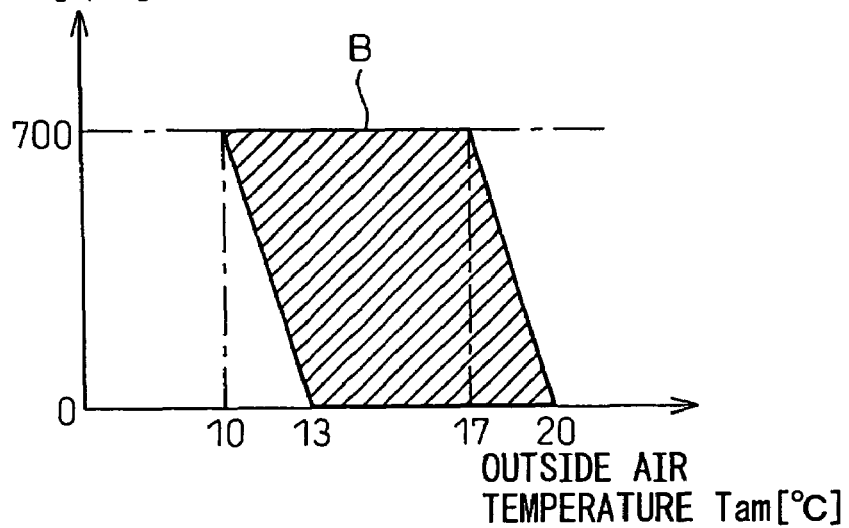
FIG. 15 is an explanatory view of a judgment condition for control for automatically stopping a blower according to a sixth embodiment.

FIG. 15 shows a specific example of the judgment method of the sixth embodiment. The temperature range where the passenger feels comfortable (specifically range of from 13° C. to 20° C.) is set as the outside air temperature Tam when there is no sunshine striking the vehicle compartment. This comfortable temperature range shifts to the low temperature side as the amount of sunshine increases to compensate for the influence of the sunshine. This is shown by the hatching range B of FIG. 15.

In this sixth embodiment, the time when the outside air temperature Tam is in the hatching range B of FIG. 8 is judged as the heat load minimum range of the air-conditioning, and control for automatically stopping the blower 8 and the compressor 11 is carried out. Even if such a judgment method is employed, the same actions and effect as those of the fourth embodiment can be exhibited.

When the temperature Tr in the vehicle compartment is out of the hatching range B and when the amount of sunshine is not less than the upper limit value of the hatching range B of FIG. 15 (for example 700 W/m$^2$), the blower 8 and the compressor 11 are operated, and the controls of S70 and S80 of FIG. 12 are carried out.

Note that, as a modification of the sixth embodiment, it is also possible to judge the heat load minimum range of the air-conditioning by only the outside air temperature Tam without considering the amount of sunshine Ts. For example, it is also possible to judge the time when the outside air temperature Tam is within the comfortable temperature range of the passenger (for example a range of from 10° C. to 20° C.) as the heat load minimum range of the air-conditioning.

Seventh Embodiment

In the fourth embodiment, the heat load minimum range of the vehicular air-conditioning was judged based on the target blown air temperature TAO, but in the seventh embodiment, the heat load minimum range of the air-conditioning is judged by using the temperature difference between the temperature Tr in the vehicle compartment and the set temperature Tset in place of the target blown air temperature TAO.

By taking note of the relationship that the heat load of the air-conditioning decreases as the temperature difference between the temperature Tr in the vehicle compartment and the set temperature Tset is reduced, in the seventh embodiment, the time when the temperature difference between the vehicle compartment temperature Tr and the set temperature Tset is within a predetermined value (for example within ±3° C.) is judged as the heat load minimum range of the air-conditioning.

Eighth Embodiment

In the fourth embodiment, the heat load minimum range of the air-conditioning in the vehicle compartment was judged based on the target blown air temperature TAO, but in the eighth embodiment, the heat load minimum range of the air-conditioning is judged by using the temperature difference between the outside air temperature Tam and the set temperature Tset in place of the target blown air temperature TAO.

Taking note of the relationship that the heat load of the air-conditioning is reduced as the temperature difference between the outside air temperature Tam and the set temperature Tset is reduced, in the eighth embodiment, the time when the temperature difference between the outside air temperature Tam and the set temperature Tset is within a predetermined value (for example within ±5° C.) is judged as the heat load minimum range of the air-conditioning.

Modifications of Fourth to Eighth Embodiments

The present invention is not limited to the above embodiments. Various modifications are possible as will be exemplified below.

(1) In the fourth embodiment, when turning on the automatic switch 43 of the air-conditioning panel 36, it was reliably judged if the heat load of the air-conditioning was in the minimum range (S60 of FIG. 12) and when the heat load of the air-conditioning was within the minimum range, the operation of the blower 8 and the compressor 11 was automatically stopped (S90, S100 of FIG. 12), but for example, it is also possible to divide the automatic switch 43 into two first and second switches, perform control not automatically stopping the blower 8 as in FIG. 13 when the first automatic switch is turned on, and perform control automatically stopping the blower 8 as in FIG. 4 (also automatically stopping the compressor 11 linked with that) only when the second automatic switch is turned on.

(2) In the fourth embodiment, when the heat load of the air-conditioning was within the minimum range, the operation of the blower 8, the air-conditioner and the compressor 11 was automatically stopped, but at a high latitude area, the weather is cool even in the summer season, so the cooling action becomes unnecessary.

Accordingly, in a vehicular air-conditioner for such a high latitude area, a refrigeration cycle system 10 including an evaporator 9 used as the cooling use heat exchanger becomes unnecessary. Accordingly, in a vehicular air-conditioner not provided with such a refrigeration cycle system 10, control for automatically stopping only the blower 8 may be carried out when the heat load of the air-conditioning is within the minimum range.

(3) In the fourth embodiment, an explanation was given of the case where use was made of a fixed volume compressor always operating with a constant discharge volume as the compressor 11 of the refrigeration cycle system 10, but it is also possible to use a variable volume compressor able to adjust the discharge volume as the compressor 11. When using a variable volume compressor is used, at step S80 of FIG. 12, the discharge volume may be controlled to continuously change so that the actual blown air temperature Te of the evaporator 9 becomes the target evaporator blown air temperature TEO. Further, the control for stopping the compressor of step S100 of FIG. 12 may be performed when the discharge volume is the minimum capacity near 0%.

(4) It is also possible to use an electric compressor with a rotational speed which can be adjusted as the compressor 11. In this case, at step S80 of FIG. 12, the rotational speed of the compressor may be continuously controlled so that the actual blown air temperature Te of the evaporator 9 becomes the target evaporator blown air temperature TEO.

(5) In the fourth embodiment, the air mix door 17 was used as the temperature adjusting means of the blown air into the vehicle compartment, but it is also possible to use a known hot water valve for adjusting the flow rate and the temperature of the hot water flowing into the heater core 15 as this temperature adjusting means.

Ninth Embodiment

In the embodiments described below, vehicular air-conditioners comprise novel inside air temperature detection devices an this point is different from the previously described embodiments. In the following embodiments, the flow of the air-conditioning automatic control and the other configurations of the air-conditioner are the same as those of the fourth embodiment shown in FIG. 1, FIG. 2, and FIG. 12, so their explanations will be omitted. Below, an explanation will be given of only the difference between the present embodiment and the first embodiment.

Note that when the judgment of step S60 becomes YES and control is performed for automatically stopping the blower 8, by turning on display portions 42a' and 43a provided in an OFF switch 42a of a blower operation switch 42 and the automatic switch 43 of the air-conditioning panel 36, it can be displayed to the passenger that control for automatically stopping the blower 8 is being carried out. The display portions 42a' and 43a may be configured by known light emission diodes etc.

Even at the time of automatic stopping of the blower 8, by setting the inside/outside air switch door 6 of the inside/outside air switch box 5 to the outside air mode position for introducing the outside air (air outside of the vehicle compartment) from the outside air introduction port 4, the outside air is introduced into the case 2 of the vehicle compartment air-conditioning unit 1 by the vehicle operation dynamic pressure. This introduced outside air is adjusted in temperature by the air mix door 17, so temperature adjusted air can be blown into the vehicle compartment.

Accordingly, it is necessary to precisely control the temperature of the blown air into the vehicle compartment even when the blower 8 is automatically stopped. For this reason, it is necessary to precisely detect the inside air temperature by the inside air temperature sensor 32 even when the blower 8 is automatically stopped.

Nevertheless, in the inside air temperature detection device of the conventional representative aspirator method shown in FIG. 21, when the blower 8 is automatically stopped, as mentioned above, due to the reduction of the flow rate of air passing through the inside air temperature sensor 32 and the influence of the heat conduction from the vehicle compartment air-conditioning unit 1, the inside air temperature cannot be precisely detected.

Figure 16:
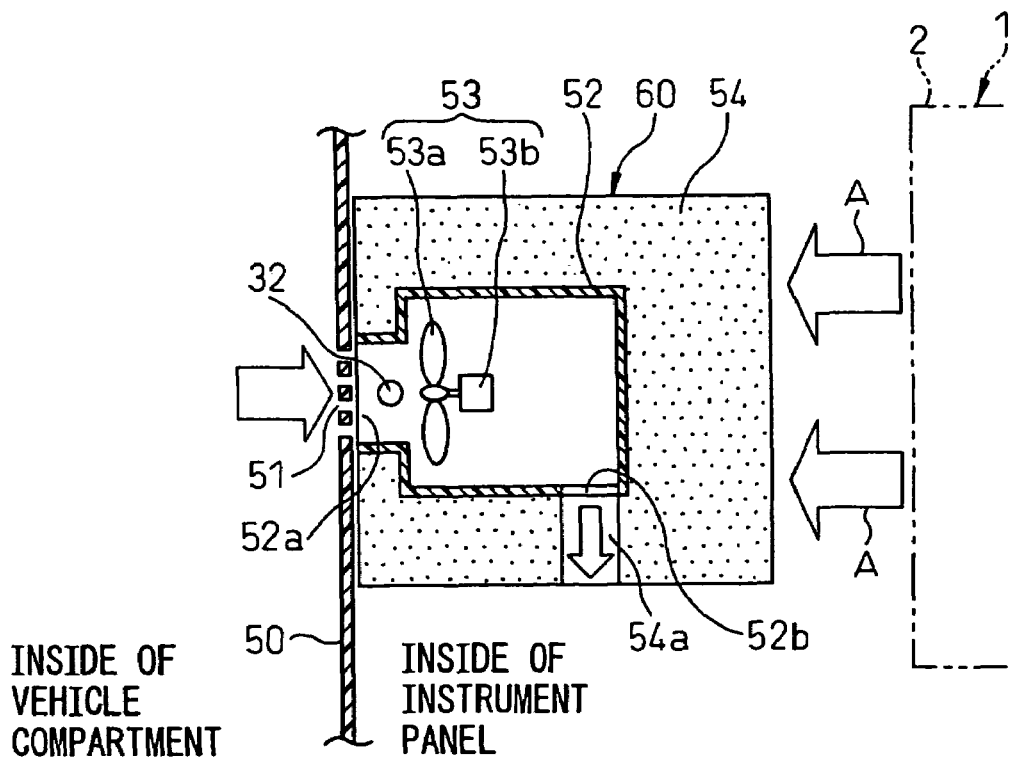
FIG. 16 is a sectional view of a specific example of an inside air temperature detection device according to a seventh embodiment.
Figure 17:
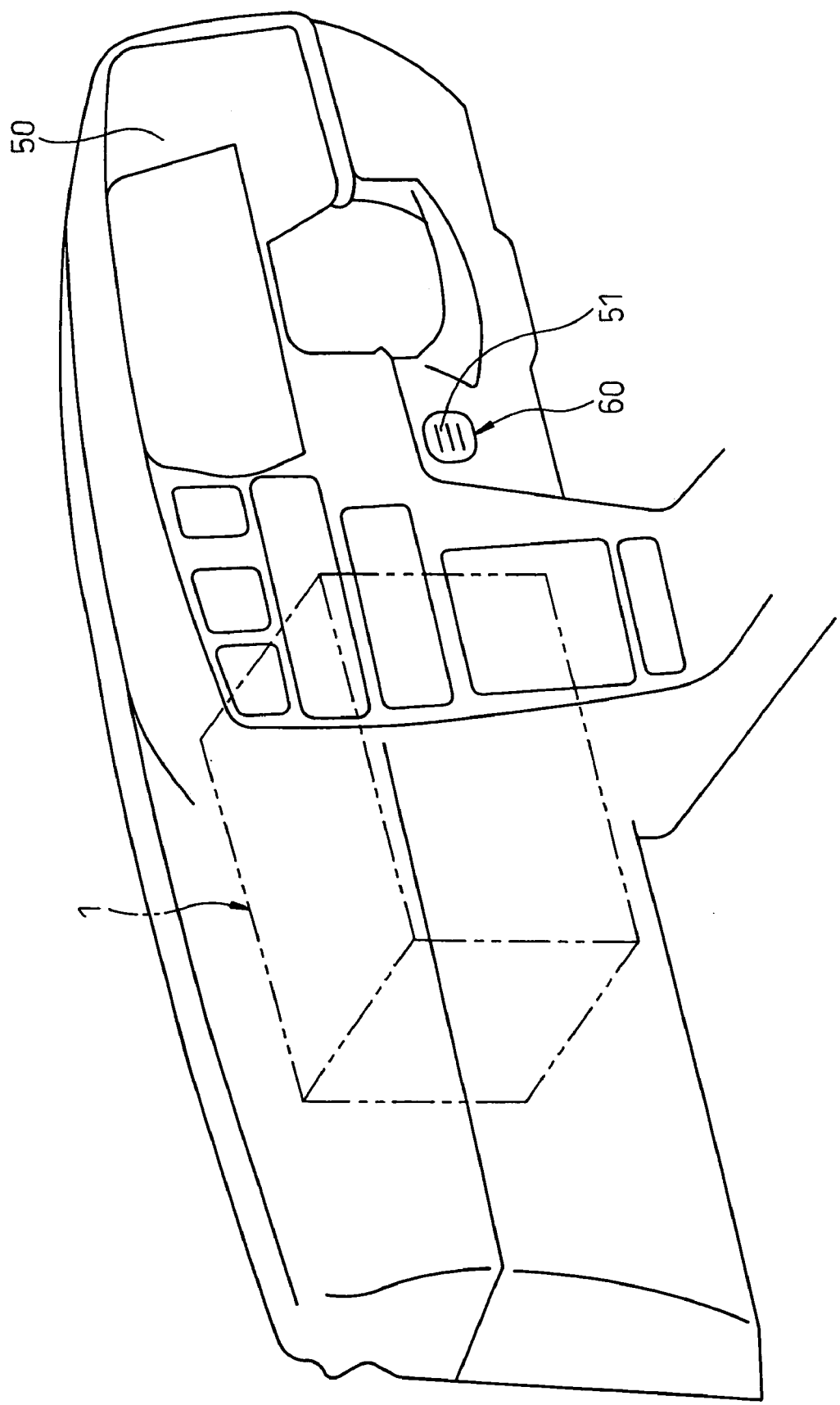
FIG. 17 is a sectional view of an example of arrangement of a vehicle compartment air-conditioning unit and the inside air temperature detection device with respect to an instrument panel according to the seventh embodiment.

Therefore, in the present embodiment, for the precise detection of the inside air temperature, the inside air temperature detection device is configured as shown in FIG. 16. In FIG. 16, in the instrument panel 50, an inside air suction port 51 having lattice-like slits is opened in the wall surface facing the passenger side in the vehicle compartment. This inside air suction port 51 is usually set in the instrument panel 50 at a position in front of the driver seat as shown in FIG. 17. More specifically, the inside air suction port 51 is set near the portion above the left knee of the driver. Note that, FIG. 17 shows a case of a right handed steering wheel car arranging the driver seat at the right side of the vehicle.

The vehicle compartment air-conditioning unit 1 is arranged from the front side of the passenger seat to near the center portion in the horizontal direction of the vehicle in the inside space of the instrument panel 50.

A sensor case 52 made of plastic is arranged in the inside portion of the inside air suction port 51 (inside portion of the instrument panel 50), an inside air inlet 52a is provided at one end side of this sensor case 52, and this inside air inlet 52a is connected to the inside air suction port 51 of the instrument panel 50.

The inside air temperature sensor 32 and the sensor fan 53 are arranged inside the sensor case 52. The sensor fan 53 is the electric fan configured by an axial flow type blowing fan 53a and a fan driving motor 53b. By supplying the power to the fan driving motor 53b through the air-conditioning control device 29, the motor 53b rotates and the sensor fan 53 performs the blowing action.

On the other end of the sensor case 52, that is, the end portion on the side away from the inside air suction port 51 in the sensor case 52, an inside air outlet 52b is provided. The outside surface of the sensor case 52 covers the entire part except the inside air inlet 52a and the inside air outlet 52b by a heat insulation cover 54.

This heat insulation cover 54 is a member for blocking the heat from the case 2 of the vehicle compartment air-conditioning unit 1 and is made by a plastic porous heat insulating material etc. excellent in heat insulation. This heat insulation cover 54 is provided with an inside air outlet hole 54a communicated with the inside air outlet 52b of the sensor case 52. In FIG. 16, the inside air temperature detection device 60 comprises the inside air temperature sensor 32, the sensor case 52, the sensor fan 53, the heat insulation cover 54, etc.

According to the inside air temperature detection device 60 of FIG. 16, by supplying power to the fan driving motor 53b through the air-conditioning control device 29, the motor 53b rotates and the sensor fan 53 performs a blowing action from the inside air suction port 51 toward the sensor case 52.

Regardless of the operation and stopping of the air-conditioning blower 8, this sensor fan 53 can always provide a predetermined blowing action by the rotation of the motor 53b. Accordingly, even when the operation of the air-conditioning blower 8 is stopped, the inside air of the flow rate required for detecting the inside air temperature is sucked from the inside air suction port 51 and can be blown into the sensor case 52.

In addition, even if the sensor case 52 and the vehicle compartment air-conditioning unit 1 are arranged adjacent in the inside space of the instrument panel 50, the outer surface of the sensor case 52 is covered by the heat insulation cover 54, therefore the transmission of the heat A of the vehicle compartment air-conditioning unit 1 to the sensor case 52 can be prevented by the heat insulation cover 54.

From the above description, even at the time of automatic stopping of the blower 8, the inside air temperature can be precisely detected by the inside air temperature sensor 32, and the vehicle compartment blown air temperature can be precisely controlled based on the detected temperature.

FIG. 18(A) shows the results of experiments showing the effect by the inside air temperature detection device of the ninth embodiment (FIG. 16). The ordinate of FIG. 18A indicates the temperature, and the abscissa indicates the time. In FIG. 18(A), during a time of 0 to 5 minutes, the blower 8 operates, and the temperature in the vehicle compartment (inside air temperature) is maintained near the set temperature Tset. Then, after the elapse of 5 minutes, the blower 8 is stopped.

In this way, the actual vehicular mean temperature TrO when automatically controlling the operation and stopping of the blower 8, the detected temperature Tr1 of the inside air temperature sensor 32 of the inside air temperature detection device of FIG. 16, and the detected temperature Tr2 of the inside air temperature sensor 32 of the inside air temperature detection device of the conventional aspirator method shown in FIG. 21 are shown.

Note that the actual vehicular mean temperature TrO is the mean value of the measured temperatures at six portions shown in FIG. 18(B). As the experimental conditions, the inside/outside air suction mode of the air-conditioning is the outside air mode, and the outside air temperature Tam is 10° C.

FIG. 18(A) shows an experiment under a heating condition in the winter season where the outside air temperature Tam=10° C., therefore, after stopping the blower 8, the vehicular mean temperature TrO gradually falls from the set temperature Tset due to the fall of the flow rate of the air (warm air) blown into the vehicle compartment.

According to the inside air temperature detection device of the ninth embodiment (FIG. 16), the detected inside air temperature Tr1 tends to fall along with the fall of the vehicular mean temperature TrO, therefore the precision of detection of the inside air temperature can be secured to a certain extent even after the stopping of the blower 8.

Note that, in the conventional aspirator method (FIG. 21), after stopping the blower 8, conversely to the fall of the vehicular mean temperature Tr0, the detected inside air temperature Tr2 thereof tends to rise, and the precision of detection of the inside air temperature is conspicuously degraded.

Note that, in the ninth embodiment, the air mix door 17 of FIG. 1 configures the "temperature adjusting means for adjusting the temperature of the air blown into the vehicle compartment", steps S70 and S90 of FIG. 12 configure the "blower controlling means for automatically controlling the operation of the blower 8", and steps S20, S40, and S50 of FIG. 12 configure the "blown air temperature controlling means for automatically controlling the operation position of the air mix door (temperature adjusting means) 17 based on at least the detected temperature of the inside air temperature detection device 60".

10th Embodiment

Figure 19:
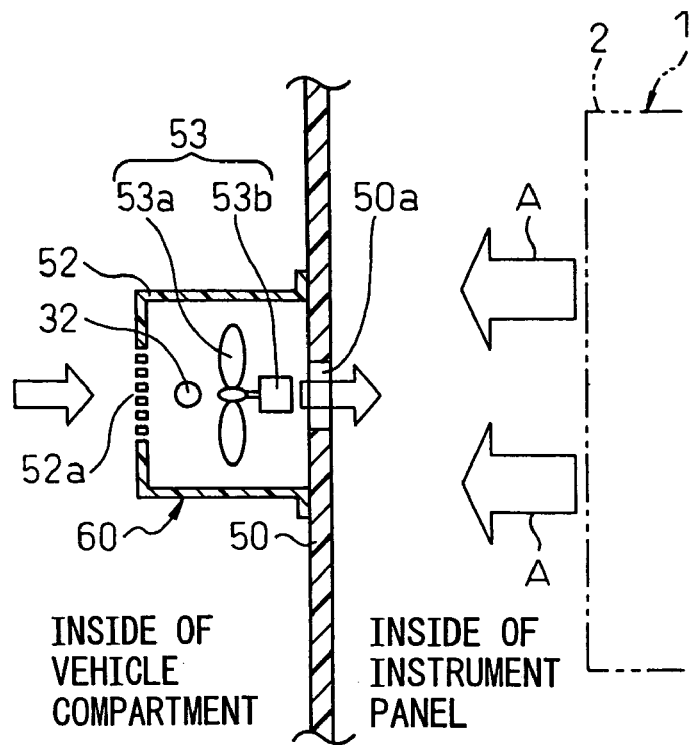
FIG. 19 is a sectional view of a specific example of an inside air temperature detection device according to an eighth embodiment.

FIG. 19 shows an inside air temperature detection device according to the 10th embodiment. The sensor case 52 is arranged on the surface of the vehicle compartment side (outer surface)in the instrument panel 50, and the inside air temperature sensor 32 and the sensor fan 53. are arranged inside this sensor case 52. The sensor fan 53 is an electric fan configured by an axial flow type blowing fan 53a and an fan driving motor 53b in the same way as the ninth embodiment.

An inside air inlet 52a having lattice like slits is provided in the front surface portion (one end portion) of the sensor case 52, and an inside air outlet 50a is provided in a portion located at the rear portion (other end side) of the sensor case 52 in the instrument panel 50. The sensor fan 53 sucks the inside air into the sensor case 52 from the inside air inlet 52a, then exhausts the inside air into the inside space of the instrument panel 50 from the inside air outlet 50a.

According to the 10th embodiment, the transmission of the heat A of the vehicle compartment air-conditioning unit 1 to the sensor case 52 by the instrument panel 50 per se can be prevented. Accordingly, even if the heat insulation cover 54 of the ninth embodiment is omitted, at the time of the automatic stopping of the blower 8, a precision of detection of the inside air temperature of the same extent as that of the ninth embodiment can be secured.

11th Embodiment

In the 10th embodiment, the sensor case 52 protrudes to the vehicle compartment side from the surface (outer surface) on the vehicle compartment side in the instrument panel 50, so there sometimes arises a problem in the design of the instrument panel 50.

Figure 20:
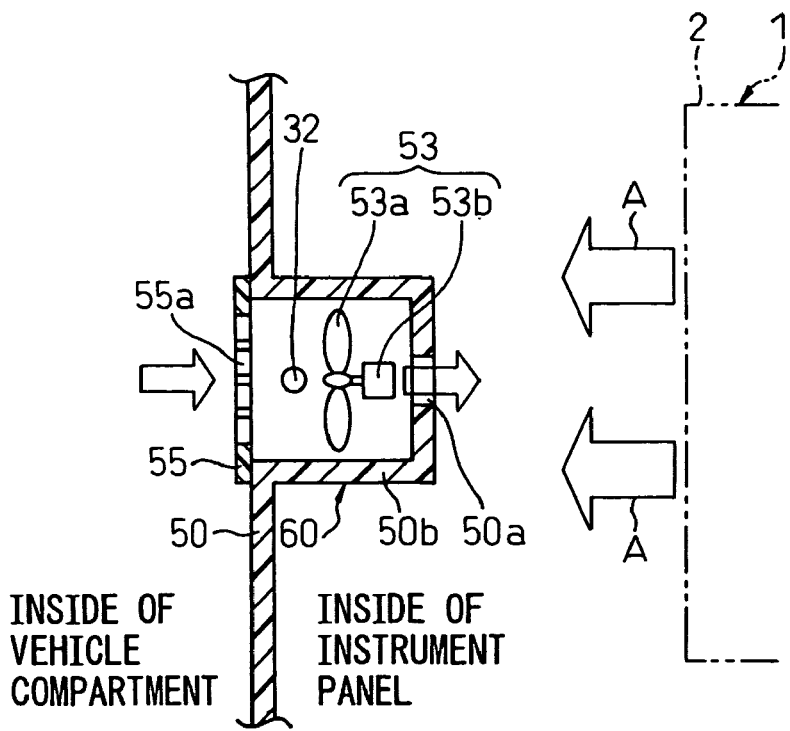
FIG. 20 is a sectional view of a specific example of an inside air temperature detection device according to a ninth embodiment.

Therefore, in the 11th embodiment, as shown in FIG. 20, a recess 50b sunk to the inward direction (front side of the vehicle) of the instrument panel 50 is formed in the instrument panel 50 per se, and the inside air temperature sensor 32 and the sensor fan 53 are arranged inside this recess 50b. A front surface member 55 formed with an inside air inlet 55a having lattice-like slits is arranged at the front surface portion (one end side) of the recess 50b.

According to the 11th embodiment, the inside air temperature sensor 32 and the sensor fan 53 are arranged in the recess 50b of the instrument panel 50, therefore the projecting shape of the sensor case 52 according to the 10th embodiment can be eliminated and the problem in design of the instrument panel 50 can be solved.

Further, in the 11th embodiment, the transmission of the heat A of the vehicle compartment air-conditioning unit 1 to the sensor case 52 by the instrument panel 50 per se can be prevented, therefore, in view of the precision of detection of the inside air temperature, effects the same as those of the 10th embodiment can be exhibited.

Other Embodiments

Note that, in the ninth embodiment, use was made of the air mix door 17 as the temperature adjusting means of the blown air into the vehicle compartment, but a known hot water valve for adjusting the flow rate and temperature of the hot water flowing into the heater core 15 may be used as this temperature adjusting means as well.

Further, if using an infrared-ray sensor for detecting the surface temperature of a predetermined portion in the vehicle compartment without contact as the inside air temperature sensor, the inside air temperature can be precisely detected also at the time of the automatic stopping of the blower 8.

Further, in the inside air temperature detection device of the conventional aspirator method shown in FIG. 21, when the blower 8 is automatically stopped, if the detected value of the inside air temperature sensor 32 is corrected to the low temperature side by only the predetermined ratio, the precision of the inside air temperature detection value when the blower 8 is automatically stopped can be improved.

While the invention has been described with reference to specific embodiments chosen for purpose of illustration, it should be apparent that numerous modifications could be made thereto by those skilled in the art without departing from the basic concept and scope of the invention.

What is claimed is:

1. An automatic control type vehicular air-conditioner for automatically controlling a temperature of air blown into a vehicle compartment and a flow rate of air blown into the vehicle compartment, comprising:
   a blower for blowing air toward an inside of the vehicle compartment,
   temperature adjusting means for adjusting the temperature of the air blown into the vehicle compartment,
   temperature controlling means for automatically controlling the temperature adjusting means so that the temperature of the air blown into the vehicle compartment becomes a target blown air temperature,
   judging means for judging if an air-conditioning heat load for maintaining a temperature in the vehicle compartment at a set temperature is within a minimum range of a predetermined amount or less, based on the target blown air temperature,
   blower controlling means for automatically controlling a flow rate of the blower in accordance with the target blown air temperature when the air-conditioning heat load is out of the minimum range,
   blower stopping means for automatically stopping the blower when judging that the air-conditioning heat load is within the minimum range, by using the judging means, wherein
   the blower controlling means maximizes the flow rate of the blower when the target blown air temperature is lower than a first predetermined temperature on a low temperature side; continuously varies the flow rate of the blower in accordance with a change of the target blown air temperature when the target blown air temperature is between the first predetermined temperature and a second predetermined temperature which is higher than the first predetermined temperature; and minimizes the flow rate of the blower when the target blown air temperature is between the second predetermined temperature and a third predetermined temperature which is higher than the second predetermined temperature,
   the judging means judges that the air-conditioning heat load is within the minimum range when the target blown air temperature is between the third predetermined temperature and a fourth predetermined temperature which is higher than the third predetermined temperature, so that said blower stopping means stops the blower based on the judgment,
   the blower controlling means minimizes the flow rate of the blower when the target blown air temperature is between the fourth predetermined temperature and a fifth predetermined temperature which is higher than the fourth predetermined temperature; continuously varies the flow rate of the blower in accordance with a change of the target blown air temperature when the target blown air temperature is between the fifth predetermined temperature and a sixth predetermined temperature which is higher than the fifth predetermined temperature; and maximizes the flow rate of the blower when the target blown air temperature is higher than the sixth predetermined temperature, and
   transition from the minimum flow rate state of the blower to a stop state thereof takes place stepwise.

2. The vehicular air-conditioner as set forth in claim 1, further comprising:
   a cooling use heat exchanger for cooling the air blown into the vehicle compartment,
   a compressor of a refrigeration cycle for creating a cooling state of the cooling use heat exchanger, and
   compressor stopping means for automatically stopping the compressor when judging that the air-conditioning heat load is within the minimum range.

* * * * *